United States Patent
Liu et al.

(10) Patent No.: US 11,304,196 B2
(45) Date of Patent: *Apr. 12, 2022

(54) RANDOM ACCESS METHOD FOR MULTIPLE NUMEROLOGY OPERATION

(71) Applicant: Telefonaktiebolaget LM Ericsson (publ), Stockholm (SE)

(72) Inventors: Jinhua Liu, Beijing (CN); Robert Baldemair, Solna (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,165

(22) Filed: Nov. 4, 2020

(65) Prior Publication Data
US 2021/0051647 A1 Feb. 18, 2021

Related U.S. Application Data

(63) Continuation of application No. 16/316,316, filed as application No. PCT/EP2017/074647 on Sep. 28, 2017, now Pat. No. 10,925,064.
(Continued)

(51) Int. Cl.
*H04W 72/04* (2009.01)
*H04W 72/02* (2009.01)
(Continued)

(52) U.S. Cl.
CPC ......... *H04W 72/048* (2013.01); *H04W 72/02* (2013.01); *H04W 72/044* (2013.01);
(Continued)

(58) Field of Classification Search
CPC ... H04W 72/048; H04W 72/02; H04W 72/04; H04W 72/0406; H04W 72/042;
(Continued)

(56) References Cited

U.S. PATENT DOCUMENTS 8,543,152 B2 9/2013 Sutivong et al.
10,356,778 B2 7/2019 Tseng et al.
(Continued)

FOREIGN PATENT DOCUMENTS

EP 2015595 A1 1/2009
JP 2015508971 A 3/2015
(Continued)

OTHER PUBLICATIONS

Panasonic, "Use of multiple numerologies in NR", 3GPP TSG RAN WG1 Meeting #86, Gothenburg, Sweden, Aug. 22-26, 2016, Agenda Item 8.1.3.1, R1-167439.
(Continued)

*Primary Examiner* — Kevin D Mew
(74) *Attorney, Agent, or Firm* — Coats & Bennett, PLLC

(57) ABSTRACT

The present disclosure introduces methods and apparatus for configuring or preconfiguring random access procedures when there are multiple configurable numerologies for one carrier. In some embodiments, the random access numerology of the wireless device is configured using the system information block. In other embodiments, the random access numerology used by the wireless device is determined implicitly based on the detection of one or more synchronization signals.

13 Claims, 20 Drawing Sheets

Related U.S. Application Data

(60) Provisional application No. 62/402,768, filed on Sep. 30, 2016.

(51) Int. Cl.
*H04W 72/08* (2009.01)
*H04W 74/00* (2009.01)
*H04W 74/08* (2009.01)

(52) U.S. Cl.
CPC ....... *H04W 72/085* (2013.01); *H04W 74/008* (2013.01); *H04W 74/0833* (2013.01)

(58) Field of Classification Search
CPC . H04W 72/044; H04W 72/085; H04W 74/00; H04W 74/002; H04W 74/006; H04W 74/008; H04W 74/0833
See application file for complete search history.

(56) References Cited

U.S. PATENT DOCUMENTS

| | | | |
|---|---|---|---|
| 2011/0044244 A1* | 2/2011 | Etemad | H04W 80/04 370/328 |
| 2011/0110227 A1* | 5/2011 | Yang | H04L 5/006 370/228 |
| 2012/0039265 A1 | 2/2012 | Patel et al. | |
| 2012/0134279 A1 | 5/2012 | Tamaki | |
| 2013/0100938 A1 | 4/2013 | Kwon et al. | |
| 2015/0003427 A1 | 1/2015 | Wan et al. | |
| 2016/0294498 A1 | 10/2016 | Ma et al. | |
| 2016/0352551 A1 | 12/2016 | Zhang et al. | |
| 2017/0164349 A1 | 6/2017 | Zhu et al. | |
| 2017/0181149 A1 | 6/2017 | Ang et al. | |
| 2017/0201968 A1* | 7/2017 | Nam | H04B 7/0632 |
| 2017/0215170 A1 | 7/2017 | Islam et al. | |
| 2017/0230954 A1 | 8/2017 | Au et al. | |
| 2017/0325155 A1 | 11/2017 | Zhou et al. | |
| 2017/0332359 A1 | 11/2017 | Tsai et al. | |
| 2018/0035421 A1 | 2/2018 | Lin et al. | |
| 2018/0049169 A1* | 2/2018 | Lin | H04W 72/042 |
| 2018/0091267 A1* | 3/2018 | Kim | H04L 27/2602 |
| 2018/0092064 A1* | 3/2018 | Ryu | H04L 27/2613 |
| 2018/0097672 A1* | 4/2018 | Jung | H04W 56/0015 |
| 2018/0124744 A1 | 5/2018 | Xue et al. | |
| 2018/0152907 A1 | 5/2018 | Zhang et al. | |
| 2018/0152964 A1* | 5/2018 | Sun | H04W 72/1273 |
| 2019/0013915 A1* | 1/2019 | Astrom | H04W 48/16 |
| 2019/0044782 A1 | 2/2019 | Zeng et al. | |
| 2019/0104554 A1* | 4/2019 | Amuru | H04W 72/042 |
| 2019/0208482 A1* | 7/2019 | Tooher | H04L 5/005 |
| 2019/0215816 A1 | 7/2019 | Tang | |
| 2019/0327769 A1* | 10/2019 | Yang | H04W 56/001 |
| 2020/0077323 A1 | 3/2020 | Park et al. | |
| 2020/0244418 A1* | 7/2020 | Baldemair | H04W 72/0446 |

FOREIGN PATENT DOCUMENTS

| | | |
|---|---|---|
| KR | 1020110074763 A | 7/2011 |
| KR | 20130021445 A | 3/2013 |
| KR | 20150023943 A | 3/2015 |
| KR | 20160052745 A | 5/2016 |
| RU | 2011135240 A | 6/2015 |
| WO | 2010008859 A1 | 1/2010 |
| WO | 2011017281 A1 | 2/2011 |
| WO | 2013010576 A9 | 1/2013 |
| WO | 2016004634 A1 | 1/2016 |
| WO | 2017123045 A1 | 7/2017 |
| WO | 2017132985 A1 | 8/2017 |
| WO | 2017218762 A1 | 12/2017 |

OTHER PUBLICATIONS

Asustek, "Impact of multiplexing numerologies on initial access", 3GPP TSG RAN WG1 Meeting #86, Gothenburg, Sweden, Aug. 22-26, 2016, Agenda Item 8.1.3.1, R1-167673.

Ericsson, "Numerology for NR Random Access and Data", 3GPP TSG-RAN WG1 Meeting #87, Reno, Nevada, USA, Nov. 14, 2016, pp. 1-2, R1-1611913, 3GPP.

Samsung, "Numerology configuration in NR", 3GPP TSG-RAN WG2 NR #98 Meeting, Hangzhou, May 15, 2017, pp. 1-7, R2-1704506, 3GPP.

Convida Wireless, "Service Differentiated Random Access", 3GPP TSG-RAN WG2 Meeting #98, Hangzhou, China, May 15, 2017, pp. 1-3, R2-1705662, 3GPP.

Huawei, HiSilicon, Discussion on UE behavior on mixed numerology carrier, 3GPP TSG RAN WG1 Meeting #86bis, Lisbon, Portugal, Oct. 10-14, 2016, R1-1609425.

Sharp, Numerology change and mixed numerologies, 3GPP TSG-RAN WG2#98, Hangzhou, China, May 15-19, 2017, R2-1705668.

Huawei, HiSilicon, On numerology determination during initial access, 3GPP TSG RAN WG1 Meeting #88bis, Spokane, USA, Apr. 3-7, 2017, R1-1704194.

LG Electronics, et al., WF on Supporting different Numerologies in a NR carrier, 3GPP TSG RAN WG1 Meeting #85, Nanjing, China, May 23-27, 2016, R1-165806.

Catt, Physical Layer Impacts on RA Design, 3GPP TSG RAN WG2 Meeting #95, Gothenburg, Sweden, Aug. 22-26, 2016, R2-164817.

Nokia, et al., On System Design for Multiple Numerologies—Initial Access, 3GPP TSG-RAN WG1 Meeting #86, Gothenburg, Sweden, Aug. 22-26, 2016, R1-167258.

Samsung, RAN Design Issues for Supporting Slicing, 3GPP TSG-RAN WG2 Meeting #95, Göteborg, Sweden, Aug. 22-26, 2016, R2-165277.

Catt, PRACH design for Rel-14 eLAA, 3GPP TSG RAN WG1 Meeting #85, Nanjing, China May 23-27, 2016, R1-164199.

Intel Corporation, On the need to support PRACH for eLAA, 3GPP TSG RAN WG1 Meeting #84, St. Julian's, Malta, Feb. 15-19, 2016, R1-160423.

ZTE, Random access procedure for NB-IoT, 3GPP TSG RAN WG1 #84, St. Julian's, Malta, Feb. 15-19, 2016, R1-160483.

* cited by examiner

RANDOM ACCESS METHOD FOR MULTIPLE NUMEROLOGY OPERATION

RELATED APPLICATIONS

This application is a continuation of prior U.S. application Ser. No. 16/316,316, filed 8 Jan. 2019, which was the National Stage of International Application PCT/EP2017/074647 filed 28 Sep. 2017, which claims the benefit of U.S. Provisional Application No. 62/402,768, filed 30 Sep. 2016, the entire disclosure of each being hereby incorporated by reference herein.

TECHNICAL FIELD

The present disclosure relates generally to wireless communication networks with mixed numerology and, more particularly, to random access procedures in mixed numerology wireless communication systems.

BACKGROUND

Fifth Generation (5G) or Next Radio (NR) wireless communication networks will provide support for multiple types of services using a common Radio Access Network (RAN). Services provided by NR wireless communication networks may, for example, include Enhanced Mobile Broadband (eMBB), Machine-Type Communication (MTC), Massive Machine-Type Communication (mMTC), and Ultra-Reliable Low Latency Communication (URLLC). These services require different Quality of Service (QoS) in terms of delay, data rate, and packet loss rate. For example, URLLC requires low delay and/or high reliability. mMTC, which is often used for infrequent transmission of small packets, typically requires long battery lifetime but does not require low delay or high data rate. eMBB, in contrast, requires high data rates, often with strict requirements on delay but typically less strict than in URLLC.

In order to fulfil the QoS requirements (e.g., delay) for different services, it has been proposed to introduce mixed numerologies in one carrier so that the services mentioned above can be served over one carrier. In mixed numerology systems, the component carrier can be divided into two or more sub-bands with different numerologies to support services with different QoS requirements. The subcarrier spacing in a sub-band can be $2^n \times 15$ kHz, where n is configurable. Therefore, there is a need for random access procedures that can accommodate NR systems or other wireless communication networks using mixed numerology. To date, little consideration has been given to random access procedures in NR systems or other wireless communication networks using mixed numerology.

SUMMARY

The present disclosure introduces methods and apparatus for configuring or preconfiguring random access procedures when there are multiple configurable numerologies for one carrier. In some embodiments, the random access numerology of the wireless device is configured using the System Information Block (SIB). In other embodiments, the random access numerology used by the wireless device is determined implicitly based on the detection of one or more synchronization (SYNC) signals.

Exemplary embodiments of the disclosure comprise methods implemented by a wireless device of random access in a wireless communication network supporting multiple numerologies. More specifically, the methods may be employed in mixed numerology systems using one numerology for random access and a different numerology for at least one data channel.

According to one exemplary method, the wireless device receives System Information (SI) from a base station or other network node in the wireless communication network. The SI contains configuration information indicating a configuration for random access. Based on the configuration information received in the SI, the wireless device determines a numerology for random access. The method further comprises performing random access on a sub-band configured according to the determined numerology to establish a connection with the base station. In some embodiments, the method further comprises transmitting user data to the base station or other network node on a shared Uplink (UL) channel.

According to another exemplary method, the wireless device receives SI from a base station or other network node in the wireless communication network. The SI contains configuration information indicating a configuration for random access. Based on the configuration information received in the SI, the wireless device determines a first numerology for random access. The method further comprises performing random access on a sub-band configured according to the first numerology to establish a connection with the base station. After establishing the connection with the network node, the wireless device switches to a second sub-band configured according to a second numerology for data transmission on a shared UL channel. In some embodiments, the method further comprises transmitting user data to the base station or other network node on a shared UL channel.

According to another exemplary method, the wireless device receives SI from a base station or other network node in the wireless communication network. The SI contains configuration information indicating a numerology for random access. The method further comprises performing random access on a sub-band configured according to the indicated numerology to establish a connection with the base station. The indicated numerology enables the base station or other network node to process a random access preamble and subsequent transmission on a shared UL channel using common processing hardware. In some embodiments, the method further comprises transmitting user data to the base station or other network node on the shared UL channel.

According to another exemplary method, the wireless device receives SI from a base station or other network node in the wireless communication network. The SI contains configuration information indicating a configuration for random access. Based on the configuration information received in the SI, the wireless device determines a default numerology for random access. The method further comprises performing a random access on a sub-band configured according to the default numerology to establish a connection with the base station. After establishing the connection with the network node, the wireless device switches to a second sub-band configured according to a second numerology for data transmissions.

According to another exemplary method, the wireless device receives SI from a base station or other network node in the wireless communication network. The SI contains configuration information indicating two or more available numerologies for random access. Based on the configuration information received in the SI, the wireless device selects one of the available numerologies for random access. The method further comprises performing random access using the selected numerology. In some embodiments, the method further comprises, after performing the random access, switching to a sub-band configured according a different numerology for data transmission.

According to another exemplary method, the wireless device detects one or more synchronization signals transmitted by the base station or other network node. The wireless device determines one or more available numerologies from the detected synchronization signals and performs a random access on a sub-band configured according to one of said available numerologies to establish a connection with the base station or other network node.

Other embodiments of the disclosure comprise wireless devices configured to perform the random access methods described above. In some embodiments, the wireless device comprises an interface circuit for communicating with a network node in the wireless communication network and a processing circuit configured to perform the random access methods. In some embodiments, the wireless device further comprises memory storing program code that when executed by the processing circuit in the wireless device causes the wireless device to perform the random access methods as noted above.

Other embodiments of the disclosure comprise a computer program product comprising executable instructions that, when executed by a processing circuit in a wireless device, causes the wireless device to perform any one of the random access methods as noted above. Still other embodiments comprise a carrier containing the computer program product. The carrier may comprise one of an electronic signal, optical signal, radio signal, or computer readable storage medium.

Other embodiments comprise methods of random access implemented by a base station or other network node in a wireless communication network supporting multiple numerologies. According to one exemplary method, the base station or network node transmits SI to wireless devices in an area served by the base station or other network node. The SI contains configuration information for random access enabling the wireless devices in the service area of the base station to determine a first numerology for random access. The base station or other network node monitors a random access channel in one or more sub-bands configured according to the available numerology or numerologies.

According to one exemplary method, the base station or network node transmits SI to wireless devices in an area served by the base station or other network node. The SI contains configuration information for random access enabling the wireless devices in the service area of the base station to determine a first numerology for random access. The base station or other network node monitors a random access channel configured according to the first numerology. In one embodiment, the random access method implemented by the base station further comprises receiving a random access preamble from the wireless device on a first sub-band configured according to the first numerology and receiving an UL transmission from the wireless device on a shared UL channel configured according to a second numerology different from the first numerology.

According to another exemplary method, the base station or other network node in the wireless communication network transmits SI to wireless devices in an area served by the base station or other network node. The SI contains configuration information including two or more available numerologies for random access. The base station or network node monitors one or more random access channels in sub-bands configured according to the available numerologies. In some embodiments, the random access method implemented by the base station further comprises receiving a random access preamble from the wireless device on a sub-band configured according to one of the available numerologies.

According to another exemplary method, the base station or other network node in the wireless communication network transmits SI to wireless devices in an area served by the base station or other network node. The SI contains configuration information indicating a numerology for random access. The base station or other network node monitors a random access channel configured according to the indicated numerology. In some embodiments, the base station subsequently receives a preamble transmitted on the random access channel using processing hardware adapted to receive data transmissions from the wireless device on a shared UL channel.

Other embodiments of the disclosure comprise a base station or other network node configured to perform the random access methods described above. In some embodiments, the base station or network node comprises an interface circuit for communicating with wireless devices in the wireless communication network and a processing circuit configured to perform the random access methods. In some embodiments, the base station or network node further comprises memory storing program code that when executed by the processing circuit in the wireless device causes the wireless device to perform the random access methods as noted above.

Other embodiments of the disclosure comprise a computer program product comprising executable instructions that, when executed by a processing circuit in a base station or network node, causes the base station or network node to perform any one of the random access methods as noted above. Still other embodiments comprise a carrier containing the computer program product. The carrier may comprise one of an electronic signal, optical signal, radio signal, or computer readable storage medium.

DETAILED DESCRIPTION

Figure 1:
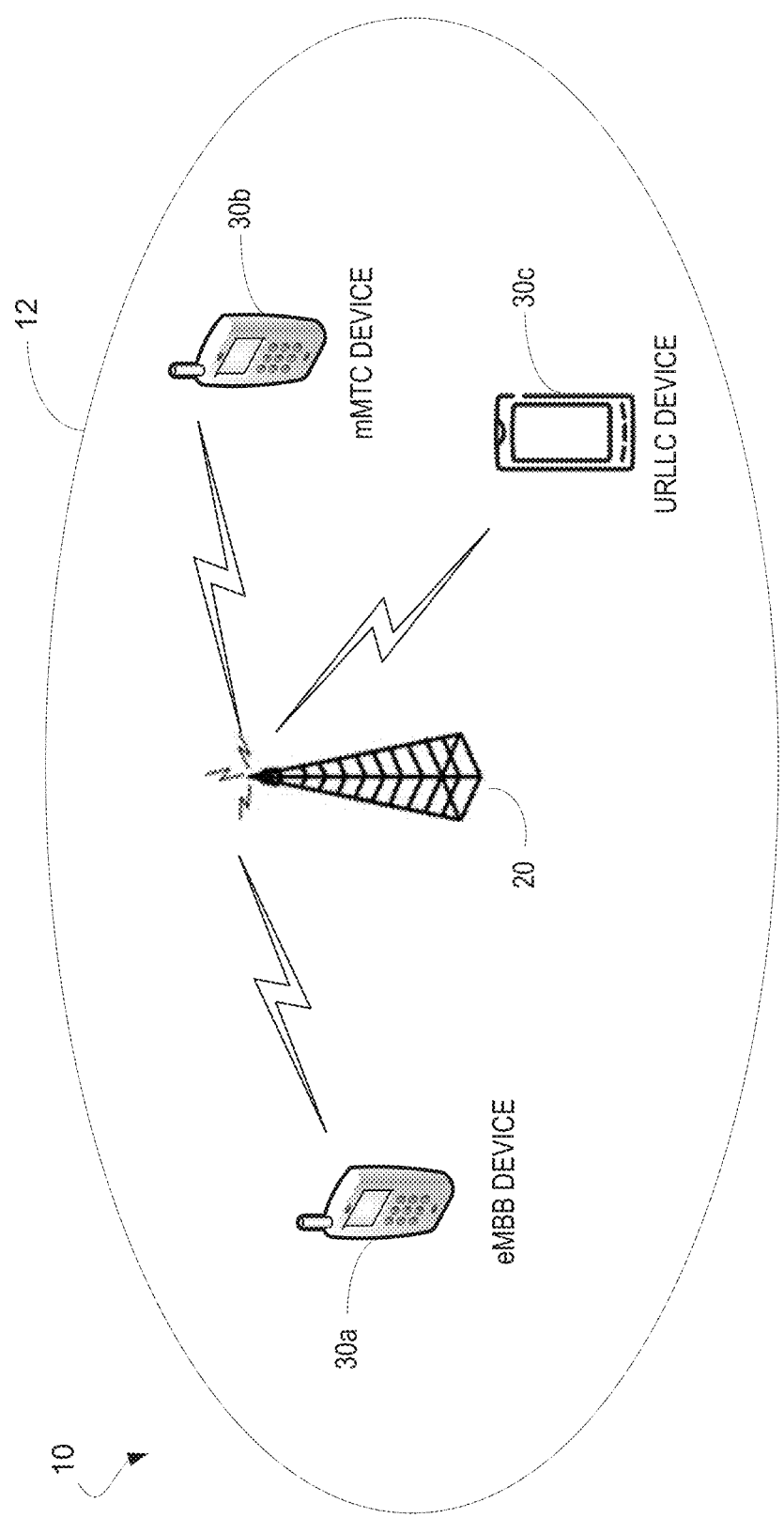
FIG. 1 illustrates a wireless communication network supporting two or more sub-bands with different numerologies.

Turning now to the drawings, FIG. 1 illustrates an exemplary wireless communication network 10 supporting mixed numerologies for user data transmissions. The communication network 10 comprises a plurality of cells 12, though only one cell 12 is shown in FIG. 1. A base station 20 within each cell 12 communicates with the wireless devices within the cell 12, which are indicated generally by the numeral 30. FIG. 1 illustrates three (3) wireless devices 30: an eMBB device 30a configured for MBB communications, a mMTC device 30b configured for MTC, and an URLLC device 30c configured for URLLC. The base station 20 communicates with the wireless devices 30 over a single component carrier that is divided into sub-bands configured according to different numerologies. In this example, the base station 20 communicates with the eMBB device 30a, mMTC device 30b, and URLLC device 30c over data channels in first, second, and third sub-bands respectively, which are configured according to different numerologies.

For illustrative purposes, an exemplary embodiment of the present disclosure will be described in the context of a NR communication network. Those skilled in the art will appreciate, however, that the present invention is more generally applicable to other wireless communication networks 10 supporting mixed numerology for user data transmissions.

Figure 2:
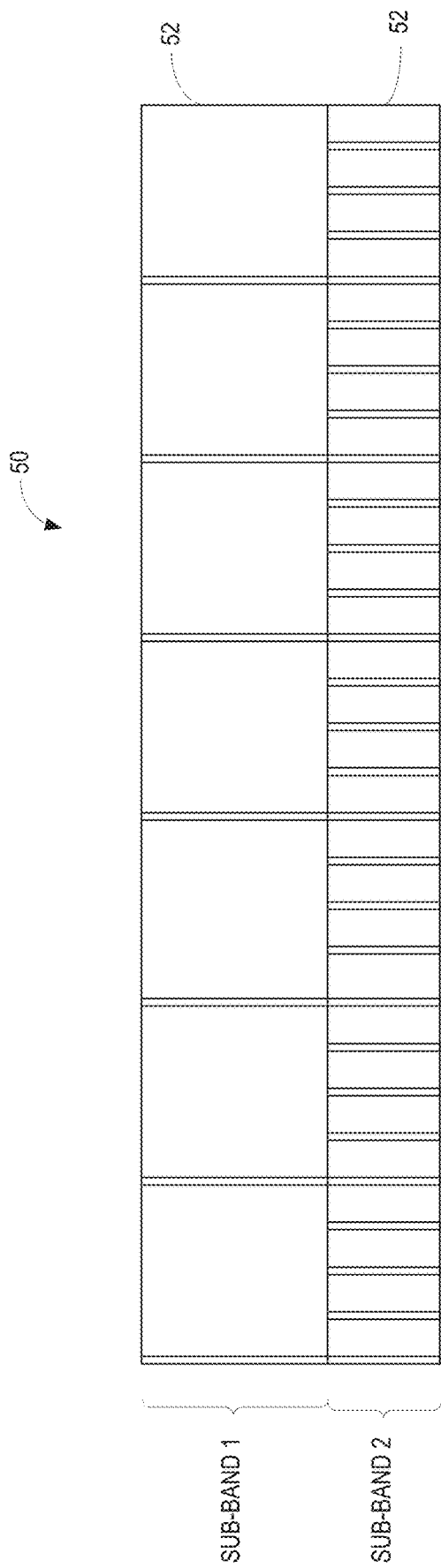
FIG. 2 illustrates an example of mixed numerologies.

FIG. 2 shows an example of mixed numerologies over one Component Carrier (CC) 50. More particularly, FIG. 2 illustrates two sub-bands 52 denoted respectively as Sub-Band 1 (SB1) and Sub-Band 2 (SB2). SB1 is configured with relatively narrow subcarrier spacing (e.g., 15 kHz) and a relatively long symbol period compared to SB2. SB2 is configured with a relatively wide subcarrier spacing (e.g., 60 kHz) and a relatively short symbol period compared to SB1.

Figure 3A:
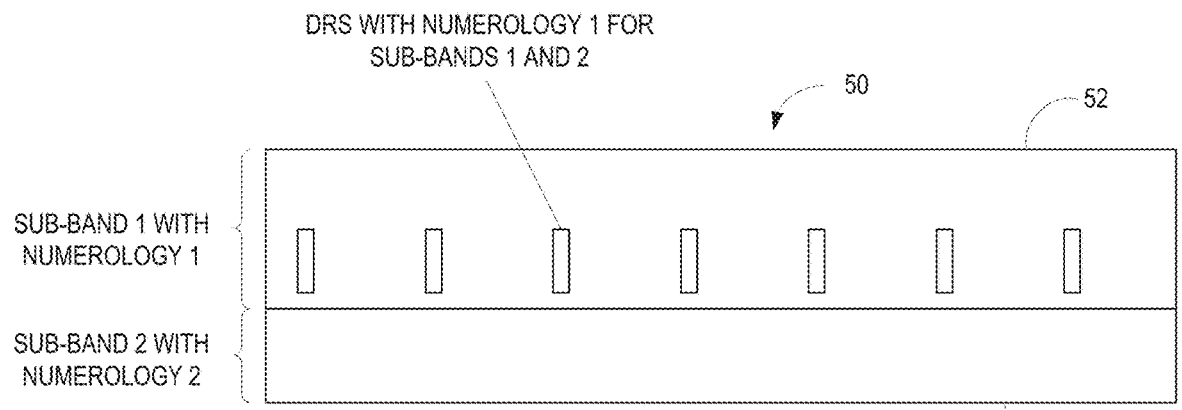
FIGS. 3a-3c illustrate possible configurations of the Discovery Reference Signal (DRS) in a mixed numerology wireless communication network.
Figure 3B:
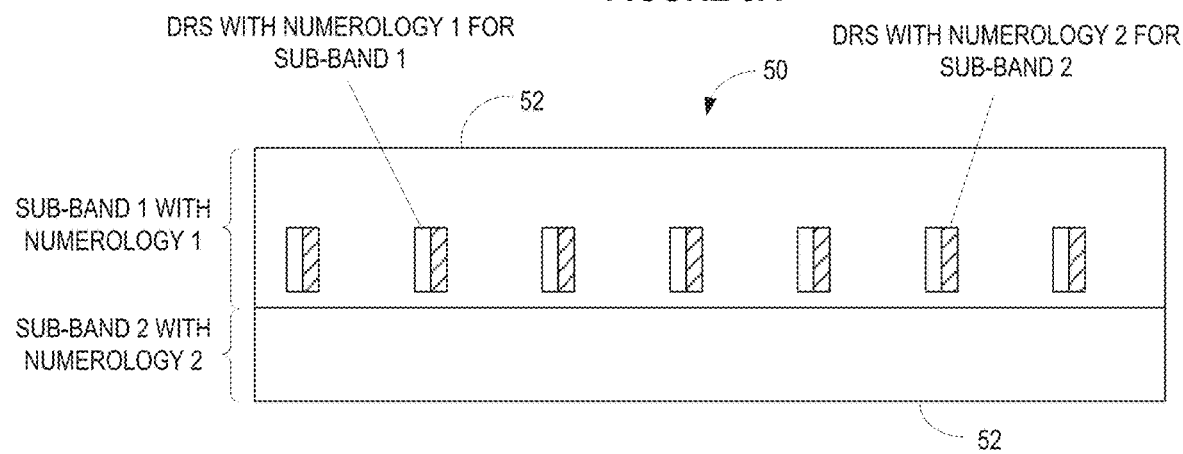
Figure 3C:
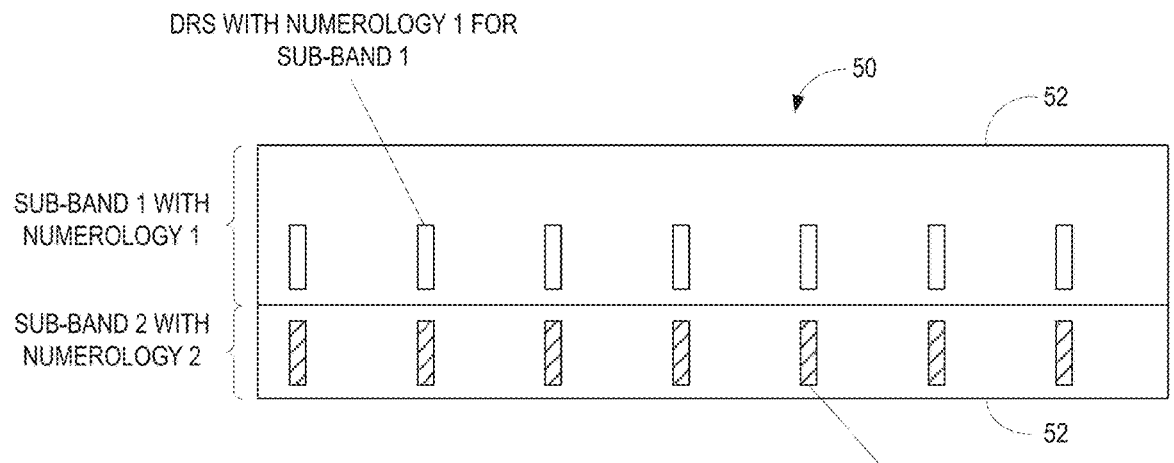

FIGS. 3A-3C illustrate possible configurations of the Discovery Referenced Signal (DRS) in a wireless communication network 10 supporting mixed numerology for user data transmissions. The DRS comprises a set of signals that can be used, for example, for cell or Transmission and Reception Point (TRP) discovery and identification, at least coarse time and frequency synchronization, and mandatory SI acquisition for initial random access. The DRS may include a Master Information Block (MIB) similar to Long-Term Evolution (LTE) systems, Mobility Reference Signal (MRS) and Channel Status Information Reference Signals (CSI-RS). Also Signature Sequences (SS) used in the process of acquiring minimum system information may be included in the DRS. In NR networks, the DRS corresponds to the Synchronization Signal Block (SSB).

FIGS. 3A-3C show different DRS configurations for a component carrier 50 having two sub-bands 52. FIG. 3A shows the two sub-bands (or RAN slices) 52 of different numerologies sharing the same DRS signal of single numerology. The discovery of the other numerology is determined either by the transmission pattern of DRS signal or the content of DRS. Alternatively, the DRS only sub-band contains information needed for initial system access and information beyond that (such as information related to multiple numerologies) is conveyed to the wireless device 30 using dedicated signaling. This design can save the DRS overhead for mixed numerology operation and simplify the DRS search, but one wireless device 30 which prefers the second numerology shall support the first numerology as well. But the DRS shall be carefully designed so that the wireless device 30 can derive good enough timing for different numerologies. We note that the DRS might be transmitted with a numerology different from both numerology 1 and 2: 3GPP currently discusses to have default DRS numerology for each frequency band or carrier frequency. If the carrier operates with a different numerology than this default numerology (e.g., due to deployment or use case), the DRS numerology is obviously different from numerology 1 and 2. This case is even relevant for a system that operates its carrier with a single numerology different from the default numerology.

FIG. 3B shows two sub-band specific DRSs located in the same part of the carrier bandwidth. The actual sub-band dimension/placement is indicated by the content carried by the respective DRS, e.g., a MIB transmitted as part of the DRS. This design simplifies the DRS search and one wireless device 30 does not have to support multiple numerology operation, but synchronization monitoring performance may be impaired due to the DRS of numerology 2 is not self-contained in the sub-band 52. Furthermore, the DRS overhead is twice as large as in the first option.

FIG. 3C shows the DRS with multiple numerologies while the DRS of each sub-band 52 is self-contained. There can be certain alignment between DRSs of different numerologies in time domain. The actual sub-band dimension/placement is indicated by the content carried by one of them or the respective DRS. The in band transmission of DRS has good performance of synchronization and Radio Resource Management (RRM) related measurement, but the location of DRS shall be adapted according to the bandwidth dimension/placement between sub-bands and the wireless device 30 may need to take a longer time to search DRS due to the fact that the location of the DRS is not predictable. In this example, the DRS overhead is twice as large as in the first option.

Although different DRS examples are presented above, those skilled in the art will appreciate that other DRS configurations are possible.

Given the large supported frequency range by NR—from less than −1 GHz to 100 GHz—NR will likely define multiple numerologies. It is currently discussed how DRS/SYNC signal should be configured. One possibility is to connect the DRS signal numerology to the operating frequency/frequency band, irrespective of the numerology used for other transmissions on the carrier. Thus, a carrier using a single numerology may contain a DRS numerology different than the numerology used for data transmissions.

Another aspect that requires consideration is how to configure the Random Access Channel (RACH) in a mixed numerology wireless communication network 10. One possibility is that the wireless communication network 10 may have multiple RACHs using different numerologies. Another possibility is that the wireless communication network 10 may have a RACH configured according to a single numerology while supporting mixed numerologies on traffic channels used for data transmissions.

To address issues raised by wireless communication networks 10 using mixed numerologies for data transmissions on traffic channels, the present disclosure describes methods to predefine or preconfigure the random access procedure. In the description below, the numerology is loosely used to refer to the sub-band configured to the numerology.

Solution 1: Configure the Wireless Device 30 Random Access Behavior Using the System Information Block.

In exemplary embodiments, there may be different configurable random access options. The base station 20 or other network node may include an indicator in the SIB to configure to wireless device 30 to use a particular random access option. Below are some example options for random access procedures:

Option 1: Wireless Device 30 Shall Perform Random Access Via Single Numerology.

According to this configuration, a wireless device 30 shall first access the wireless communication network 10 via one numerology and then switch to preferred numerology according to wireless device 30 type, traffic type and/or the preconfigured RAN slice selection rules. The numerology for random access can be the predefined default numerology or configured numerology in the system information.

As one type of implementation of numerology switch, the wireless device 30 directly switches to the other numerology without Time Advance (TA) correction using the preferred numerology. The TA configuration of one numerology can be directly used for another numerology. Further, it is also applicable to derive the power adjustment of one numerology based on the accumulated power adjustment of another numerology. For this implementation, it is assumed that there is good synchronization between numerology and the Cyclic Prefix (CP) length used in the target numerology can handle the TA inaccuracy.

As another implementation of numerology switch, the wireless device 30 may perform numerology switch with a specific TA correction using the Physical Random Access Channel (PRACH) transmission or other UL Sounding Reference Signal (SRS) transmission in UL. Based on the PRACH (or UL SRS) detection, the TA for the target numerology is derived and sent to the wireless device 30 to correct the timing for UL signal transmission.

As one example, when the wireless device 30 switches from the first numerology of 15 kHz subcarrier spacing to a second numerology of 60 kHz subcarrier spacing, the second numerology typically requires higher TA accuracy because a shorter CP is used. In this case, the wireless device 30 can be configured to transmit another PRACH (or any other reference signals, e.g., UL SRS) using the second numerology for TA measurement. For the switch in the reverse direction, the wireless device 30 can switch from the numerology with a short CP to a numerology with a longer CP. In this case, specific TA training is not necessary because the TA derived based on the default numerology is good enough.

Option 2: Wireless Device 30 Determines the Numerology for Random Access According to the Traffic Type.

According to this configuration, a service type to numerology mapping relationship can be preconfigured for a wireless device 30. When there is session request from the wireless device 30, the wireless device 30 determines the preferred numerology according to the session type. The wireless device 30 can access the wireless communication network 10 directly via the preferred numerology. In this setup, the SI contains a list of PRACH configurations, one list entry for each (group of) service. As one example, the wireless device 30 that applies for URLLC services can access the wireless communication network 10 via the numerology with wide subcarrier spacing.

As another example, some specific wireless device 30 may be designed for specific application case, e.g., wireless device 30 for mMTC or URLLC. For such wireless devices 30, the wireless device 30 can select the preferred numerology, from a list of numerologies supported by the network, for random access according to the device type or the wireless device 30. A wireless device 30 especially adapted for mMTC, can access the wireless communication network 10 via the numerology with the narrowest subcarrier spacing (e.g., 3.75 KHz), while a wireless device 30 especially adapted for URLLC may access the wireless communication network 10 via the numerology with the widest subcarrier space (e.g., 60 KHz).

Option 3: Wireless Device 30 Adaptively Select the Numerology for Random Access.

According to this configuration, the wireless communication network 10 configures the wireless device 30 to select the preferred numerology for random access, i.e., the SI contains a list of supported PRACH numerologies and the wireless device 30 selects the preferred numerology. A wireless device 30 that is nearby a base station 20 or other TRP can select the numerology with wide subcarrier spacing and short Transmission Time Interval (TTI) to reduce the delay for random access. However, for a wireless device 30 that is far from the TRP, the wireless device 30 can select the numerology with narrow subcarrier space and long TTI to improve the robustness of the random access messages. Afterwards, the wireless device 30 can switch to the preferred numerology according to QoS requirements (based on configuration from wireless communication network 10).

Option 4: Single-Numerology System.

One possible setup is a single or multi-numerology carrier where the DRS numerology is different from the numerology(ies) otherwise used on the carrier. One reason for this approach could be that DRS numerology is connected to frequency band or carrier frequency but the carrier operates with another numerology. There are some PRACH preamble design proposals that do not require dedicated PRACH Fast Fourier Transform (FFT) hardware in the receiver but enable reuse of the data channel FFT hardware. In this case the PRACH numerology should preferably match the numerology used for other UL transmissions. A base station 20 or other network node in the wireless communication network 10 may therefore indicate in the SI a PRACH numerology that is the same (or least related in a sense that the PRACH preamble can be processed with the same hardware) as the numerology used for UL transmissions on the carrier.

Solution 2: Wireless Device 30 Derive the Random Access Procedure Based on SYNC Signal Monitoring.

According to this option, the wireless device 30 derives the numerology for random access based on the detection of the SYNC signal(s).

As one example, the wireless device 30 derives the possible numerologies for random access based on the numerology (or numerologies) of the SYNC signal(s). The wireless device 30 selects the numerology that is used for SYNC signal transmission for random access (or derived via a rule from the SYNC numerology). There are different pre-configurations if the SYNC signal has used more than one numerology, It can be predefined whether to allow the wireless device 30 to select either one for random access from the numerologies used by SYNC signal; or It can be predefined that the wireless device 30 selects the preferred one from the numerologies used by SYNC signal according to the wireless device 30 type or service type; or It can be predefined that the wireless device 30 selects a single fixed numerology for random access. For instance, for SYNC designed as FIG. 3B, the wireless device 30 shall select numerology of the first part of the SYNC signal (i.e., numerology 1).

Whether to allow the wireless device 30 to perform random access via either numerology, or different wireless devices 30 to perform random access via different numerologies, the wireless communication network 10 may monitor the PRACH transmissions in multiple numerologies, which increases the computation complexity on the network side. It is expected to achieve the random access performance gain of either low latency or robust enhancement of random access messages.

As another example, the numerology for random access is indicated by the SYNC sequence. There can be multiple SYNC sequences and these SYNC sequences are divided into two groups: a SYNC sequence from the first group indicates that the wireless device 30 can start random access via the numerology used by the detected sequence; otherwise, the wireless device 30 can use any numerology used by the SYNC sequence.

With this background, various embodiments of the disclosure are described below.

Figure 4:
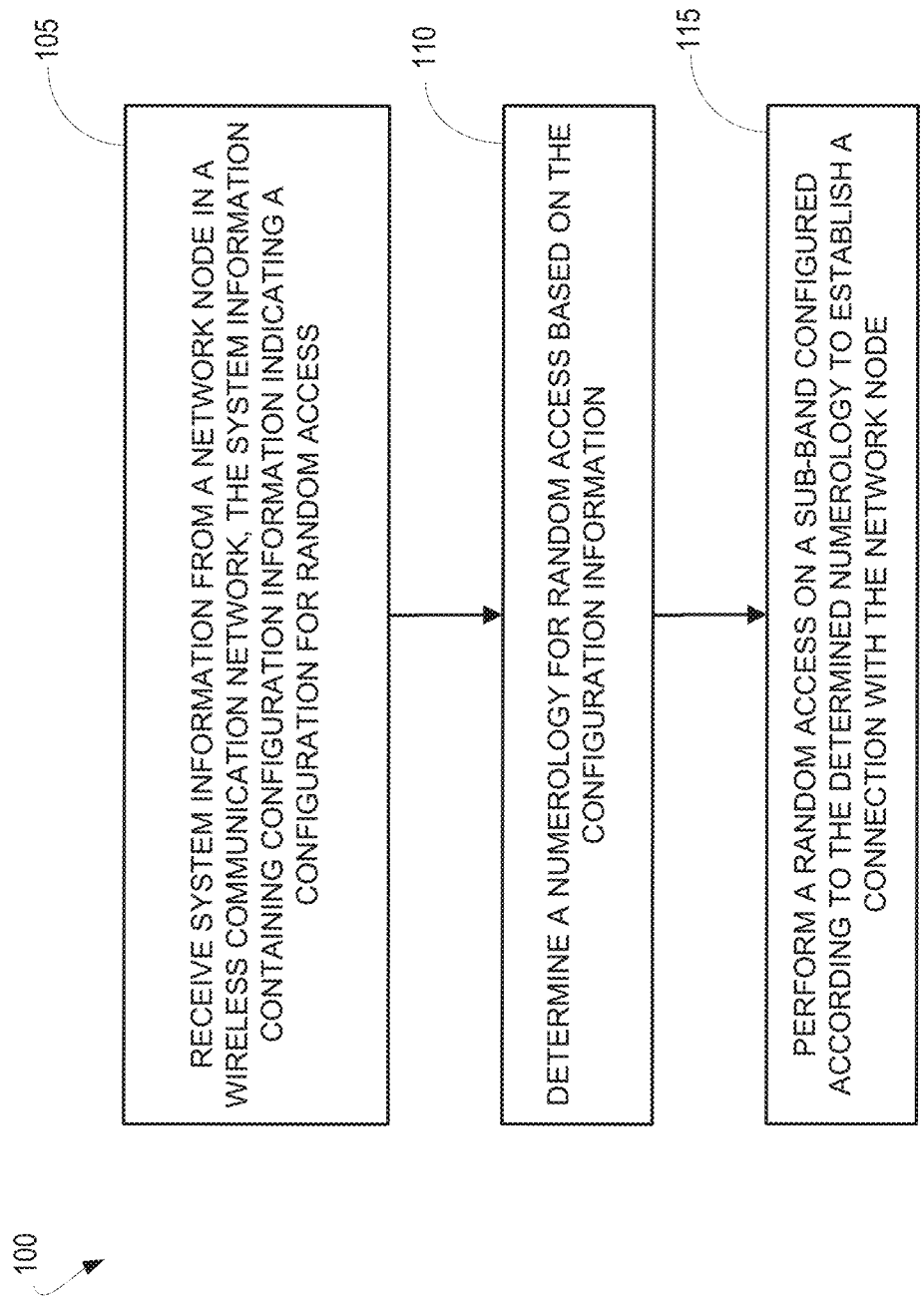
FIG. 4 illustrates a first exemplary method of random access implemented by a wireless device in a mixed numerology wireless communication network.

FIG. 4 illustrates an exemplary method 100 of random access implemented by a wireless device 30 in a mixed numerology wireless communication network 10 using mixed numerologies to support different services. The mixed numerology communication network 10 supports data transmissions to and from the wireless devices 30 over UL and/or downlink traffic channels, such as an Uplink Shared Channel (USCH) and/or and Downlink Shared Channel (DSCH). When the wireless device 30 is operating in a wireless communication network 10 supporting mixed numerologies for different services or devices, the wireless device 30 may not know the resources and/or numerology used by the RACH. In the method shown in FIG. 4, the wireless device 30 receives SI from a base station 20 or other network node in the wireless communication network (block 105). The SI contains configuration information indicating a configuration for random access. The configuration can include, for example, the numerology for random access. Based on the configuration information received in the SI, the wireless device 30 determines a numerology for random access (block 110). It will be appreciated that the wireless communication network 10 may employ a single numerology for the RACH even where multiple numerologies are supported for user traffic, or different numerologies on different RACHs. After determining a numerology for random access based on the configuration information, the wireless device 30 performs a random access on a sub-band configured according to the determined numerology to establish a connection with the base station 20 (block 115). For random access, the sub-band may simply be the carrier or frequency resources used for random access.

In some embodiments of method 100, the wireless communication network 10 may use a single numerology for random access even where multiple numerologies are supported for transmissions over user traffic channels. In this case, the wireless device 30 may perform a random access on a first sub-band configured according to a pre-configured default numerology to establish a connection with the wireless device, and then switch to a second sub-band configured according to a second numerology for data transmissions on a traffic channel. The second sub-band may be selected based on the type of the wireless device, service type, or on predefined slice selection rules.

In some embodiments of method 100, the wireless device 30 may determine a time advance during the random access on the first sub-band, and use the timing advance for the first sub-band for the data transmissions in the second sub-band. In other embodiments, the wireless device 30 may, after establishing a connection with the base station 20 or other network node in the first sub-band, obtain a timing advance from the second sub-band and use the timing advance for the second sub-band for data transmissions in the second sub-band. The timing advance may be acquired, for example, by transmitting a random access preamble in the second sub-band and receiving a random access response including the timing advance in the timing advance for the second sub-band. In another embodiment, the mobile device 30 may transmit a reference signal in the second sub-band and receive a response message responsive to the reference signal including the timing advance for the second sub-band.

In some embodiments of method 100, the wireless communication network 10 may support RACHs using different numerologies. In this case, the configuration information transmitted as part of the SI may contain a listing of two or more available numerologies for random access. The wireless device 30 may select a sub-band configured according to one of the available numerologies and perform a random access in the selected sub-band.

In one exemplary embodiment of method 100, the wireless device 30 generates, based on the configuration information, a mapping associating service types to corresponding numerologies. When the wireless device 30 needs to perform a random access, the wireless device 30 determines a service type for the connection with the base station 20 or other network node and selects a sub-band configured according to a numerology associated with the service type. The wireless device 30 then performs a random access on the selected sub-band. The mapping associating service types to corresponding numerologies may be stored in memory of the wireless device 30.

In another embodiment of method 100, the wireless device 30 may be configured to select a numerology and/or sub-band based on a distance to the base station 20 or other network node. In this embodiment, the wireless device 30 determines a distance to the base station 20 or other network node and selects an available numerology based on the distance. The wireless device 30 then selects a sub-band configured according to the selected numerology.

In other embodiments of method 100, the wireless device 30 selects a sub-band and/or numerology based on a service type for the connection with the base station 20 or other network node and/or device type. In these embodiments, the wireless device 30 determines either a service type for a desired connection to the base station 20 or other network node, or a device type of the wireless device 30. The wireless device 30 may select a numerology based on the service type for the connection with the base station 20 or other network node, the device type, or both.

In another embodiment of method 100, the configuration information indicates a numerology for random access that is substantially the same as the numerology for data transmissions on an UL traffic channel, such as the shared UL channel. In this context, the numerologies are substantially the same if the same processing hardware in the base station 20 or other network node can be used to receive both the preamble transmitted by the wireless device 30 during the random access procedure and the user data transmissions on the UL traffic channel. In this case, the wireless device 30 performs the random access on a sub-band configured according to a numerology indicated in the system information to establish a connection to the base station 20 or other network node.

Figure 5:
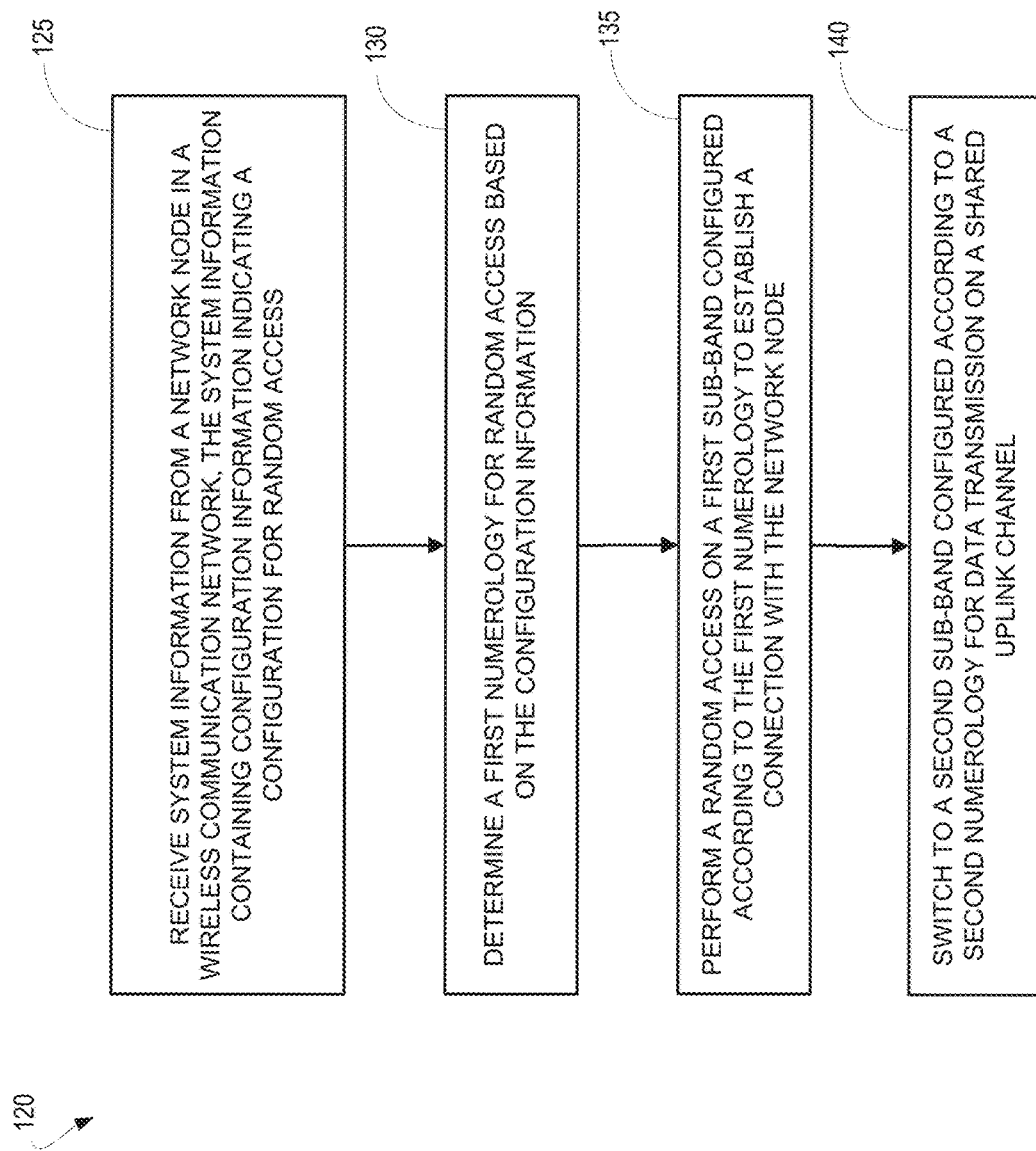
FIG. 5 illustrates a second exemplary method of random access implemented by a wireless device in a mixed numerology communication network.

FIG. 5 illustrates exemplary method 120 of random access according to another embodiment implemented by a wireless device 30 in a mixed numerology wireless communication network 10 supporting mixed numerologies to support different services. In the method shown in FIG. 5, the wireless device 30 receives SI from a base station 20 or other network node in the wireless communication network (block 125). The SI contains configuration information indicating a configuration for random access. Based on the configuration information received in the SI, the wireless device 30 determines a first numerology for random access (block 130). The method 120 further comprises performing random access on a first sub-band configured according to the indicated first numerology to establish a connection with the base station 20 (block 135). After establishing the connection with the network node, the wireless device 30 switches to a second sub-band configured according to a second numerology for data transmission on a shared UL channel (block 140). In one embodiment, the first and second sub-bands may comprise the carrier or frequency resources used for random access and data transmission, respectively.

In other embodiments of method 120, the wireless device 30 selects a sub-band and/or numerology based on a service type for the connection with the base station 20 or other network node and/or device type. In these embodiments, the wireless device 30 determines either a service type for a desired connection to the base station 20 or other network node, or a device type of the wireless device 30. The wireless device 30 may select a numerology based on the service type for the connection with the base station 20 or other network node, the device type, or both.

In other embodiments of method 120, the wireless device 30 selects a sub-band and/or numerology based on pre-defined slice selection rules.

Some embodiments of the method 120 further comprise deriving a power adjustment for the data transmissions on the second sub-band based on an accumulated power adjustment on the first sub-band.

In some embodiments of method 120, the wireless device 30 may obtain a time advance during the random access on the first sub-band, and use the timing advance for the first sub-band for the data transmissions in the second sub-band. In other embodiments, the wireless device 30 may, after establishing a connection with the base station 20 or other network node in the first sub-band, obtain a timing advance from the second sub-band and use the timing advance for the second sub-band for data transmissions in the second sub-band. The timing advance may be acquired, for example, by transmitting a random access preamble in the second sub-band and receiving a random access response including the timing advance in the timing advance for the second sub-band. In another embodiment, the mobile device 30 may transmit a reference signal in the second sub-band and receive a response message responsive to the reference signal including the timing advance for the second sub-band.

In one exemplary embodiment of method 120, the wireless device 30 generates, based on the configuration information, a mapping associating service types to corresponding numerologies. When the wireless device 30 needs to perform a random access, the wireless device 30 determines a service type for the connection with the base station 20 or other network node and then determines the first numerology based on the service type. The mapping associating service types to corresponding numerologies may be stored in memory of the wireless device 30.

In some embodiments of method 120, the wireless communication network 10 may support RACHs using different numerologies. In this case, the configuration information transmitted as part of the SI may contain a listing of two or more available numerologies for random access. In this case, the wireless device 30 selects a sub-band configured according to one of the available numerologies and performs a random access in the selected sub-band.

In another embodiment of method 120, the wireless device 30 may be configured to select the first numerology and/or sub-band based on a distance to the base station 20 or other network node. In this embodiment, the wireless device 30 determines a distance to the base station 20 or other network node and selects an available numerology based on the distance as the first numerology.

In another embodiment of method 120, the wireless device 30 may be configured to select the first numerology and/or sub-band based on a service type for the connection to the base station or network node. In this embodiment, the wireless device 30 determines a service type for the connection to the base station or network node and selects an available numerology based on the service type as the first numerology.

In another embodiment of method 120, the wireless device 30 may be configured to select the first numerology and/or sub-band based on a device type of the wireless device. In this embodiment, the wireless device 30 determines a device type of the wireless device and selects an available numerology based on the device type as the first numerology.

In another embodiment of method 120, the configuration information indicates a numerology for random access that is substantially the same as the numerology for data transmissions on an UL traffic channel, such as the shared UL channel. In this context, the numerologies are substantially the same if the same processing hardware in the base station 20 or other network node can be used to receive both the preamble transmitted by the wireless device 30 during the random access procedure and the user data transmissions on the UL traffic channel. In this case, the wireless device 30 performs the random access on a sub-band configured according to a numerology indicated in the SI to establish a connection to the base station 20 or other network node.

Figure 6:
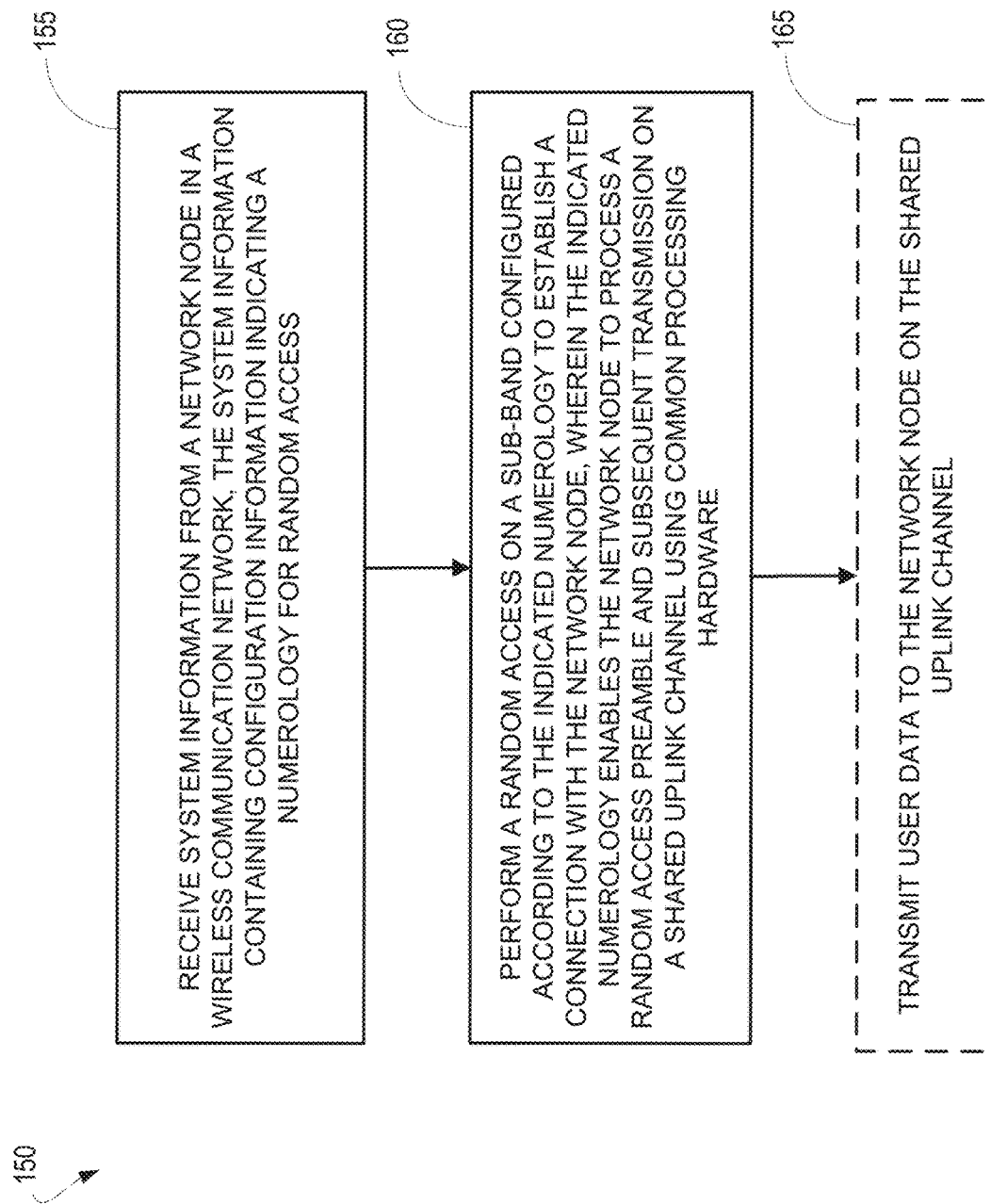
FIG. 6 illustrates a third exemplary method of random access implemented by a wireless device in a mixed numerology communication network.

FIG. 6 illustrates exemplary method 150 of random access according to another embodiment implemented by a wireless device 30 in a mixed numerology wireless communication network 10 supporting mixed numerologies to support different services. In this embodiment, the wireless device 30 receives SI from a base station 20 or other network node in the wireless communication network (block 155). The SI contains configuration information indicating a numerology for random access. The wireless device performs a random access on a sub-band configured according to the indicated numerology to establish a connection with the base station 20 (block 160). The indicated numerology enables the base station 20 or other network node to process a random access preamble and subsequent transmission on a shared UL channel using common processing hardware. In some embodiments, the method 140 further comprises transmitting user data to the base station 20 or other network node on the shared UL channel (block 165).

Some embodiments of method 150 further comprise, after performing a random access, switching to a second sub-band configured according to a different numerology for data transmissions, such as data transmissions on an UL shared channel. In some embodiments, the second sub-band/numerology can be selected based on one or more of a device type, service type, and/or distance of the wireless device from the base station or network node. In other embodiments, the second sub-band/numerology could be selected based on a configuration received from the network.

In some embodiments of the method 150, the wireless device 30 may obtain a time advance during the random access on the first sub-band, and use the timing advance for the first sub-band for the data transmissions in the second sub-band. In other embodiments, the wireless device 30 may, after establishing a connection with the base station 20 or other network node in the first sub-band, obtain a timing advance from the second sub-band and use the timing advance for the second sub-band for data transmissions in the second sub-band. The timing advance may be acquired, for example, by transmitting a random access preamble in the second sub-band and receiving a random access response including the timing advance in the timing advance for the second sub-band. In another embodiment, the mobile device 30 may transmit a reference signal in the second sub-band and receive a response message responsive to the reference signal including the timing advance for the second sub-band.

Figure 7:
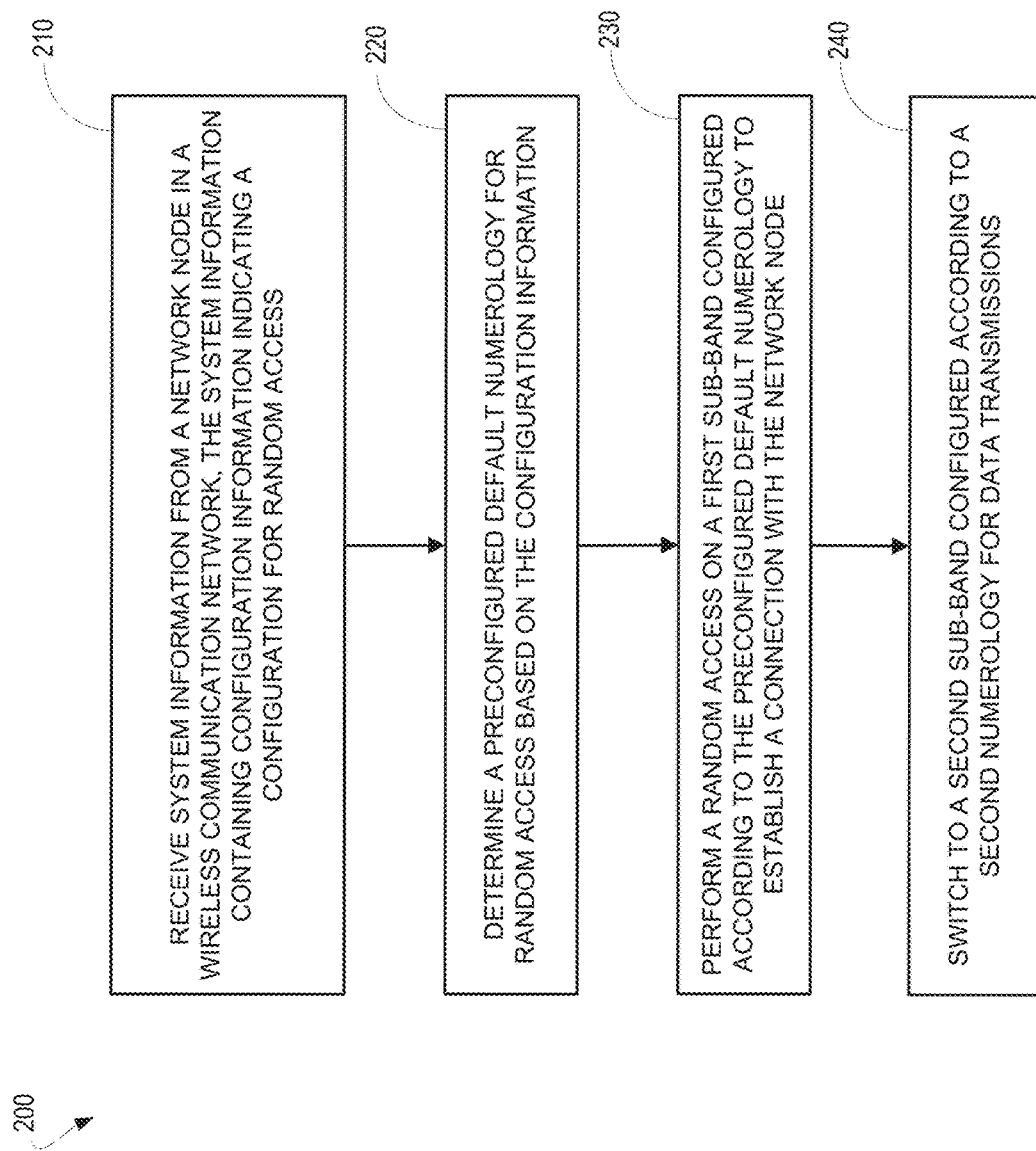
FIG. 7 illustrates a fourth exemplary method of random access implemented by a wireless device in a mixed numerology communication network.

FIG. 7 illustrates exemplary method 200 of random access according to another embodiment implemented by a wireless device 30 in a mixed numerology wireless communication network 10 supporting mixed numerologies to support different services. In this embodiment, the wireless device 30 receives SI from a base station 20 or other network node in the wireless communication network (block 210). The SI contains configuration information indicating a configuration for random access. Based on the configuration information received in the SI, the wireless device 30 determines a default numerology for random access (block 220). The method 200 further comprises performing random access on a first sub-band configured according to the indicated numerology to establish a connection with the base station 20 other network node (block 230). After establishing the connection with the network node, the wireless device 30 switches to a second sub-band configured according to a second numerology for data transmissions (block 240).

In some embodiments of method 200, the second sub-band numerology may be determined based on one or more of a device type, service type, and/or distance of the wireless device from the base station or network node.

In some embodiments of the method 200, the wireless device 30 may obtain a time advance during the random access on the first sub-band, and use the timing advance for the first sub-band for the data transmissions in the second sub-band. In other embodiments, the wireless device 30 may, after establishing a connection with the base station 20 or other network node in the first sub-band, obtain a timing advance from the second sub-band and use the timing advance for the second sub-band for data transmissions in the second sub-band. The timing advance may be acquired, for example, by transmitting a random access preamble in the second sub-band and receiving a random access response including the timing advance in the timing advance for the second sub-band. In another embodiment, the mobile device 30 may transmit a reference signal in the second sub-band and receive a response message responsive to the reference signal including the timing advance for the second sub-band.

Figure 8:
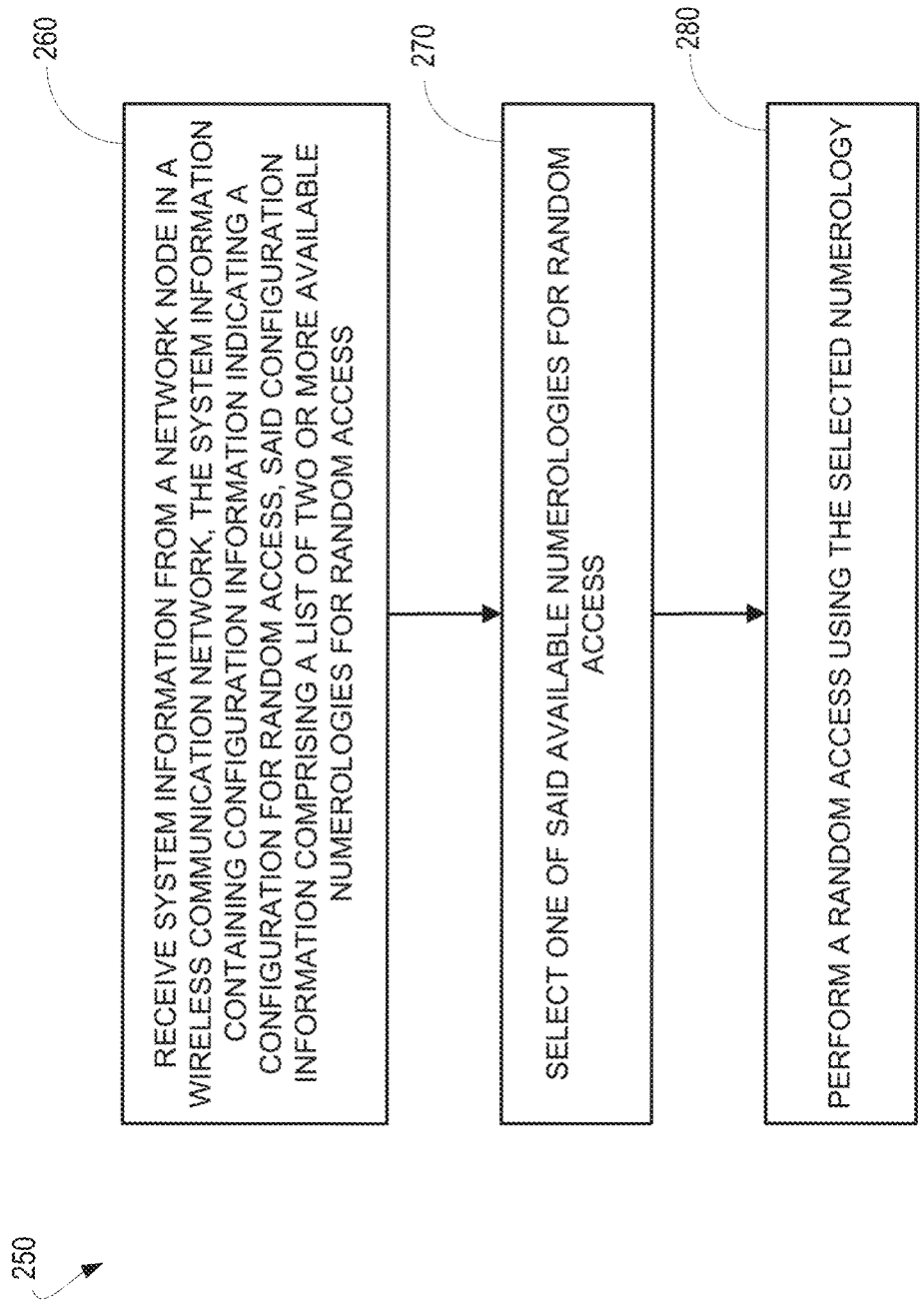
FIG. 8 illustrates a fifth exemplary method of random access implemented by a wireless device in a mixed numerology communication network.

FIG. 8 illustrates exemplary method 250 of random access according to another embodiment implemented by a wireless device 30 in a mixed numerology wireless communication network 10 supporting mixed numerologies to support different services. In this embodiment, the wireless device 30 receives SI from a base station 20 or other network node in the wireless communication network (block 260). The SI contains configuration information indicating two or more available numerologies for random access. Based on the configuration information received in the SI, the wireless device 30 selects one of the available numerologies for random access (block 270). The method 250 further comprises performing random access on a PRACH configured according to the indicated numerology to establish a connection with the base station 20 (block 280).

In some embodiments of method 250, the numerology for random access is selected based on one or more of a device type, service type, and/or distance of the wireless device from the base station or network node.

Some embodiments of method 250 further comprise, after performing a random access, switches to a sub-band configured according to a different numerology for data transmissions, such as data transmissions on an UL shared channel. The sub-band for data transmission can be selected based on one or more of a device type, service type, and/or distance of the wireless device from the base station or network node.

In some embodiments of the method 250, the wireless device 30 may obtain a time advance during the random access, and use the timing advance for the data transmissions in the sub-band selected for data transmission. In other embodiments, the wireless device 30 may, after establishing a connection with the base station 20 or other network node, obtain a timing advance from the sub-band selected for data transmissions in the second sub-band. The timing advance may be acquired, for example, by transmitting a random access preamble in the sub-band and receiving a random access response including the timing advance in the timing advance for the second sub-band. In another embodiment, the mobile device 30 may transmit a reference signal in the sub-band and receive a response message responsive to the reference signal including the timing advance for the sub-band.

Figure 9:
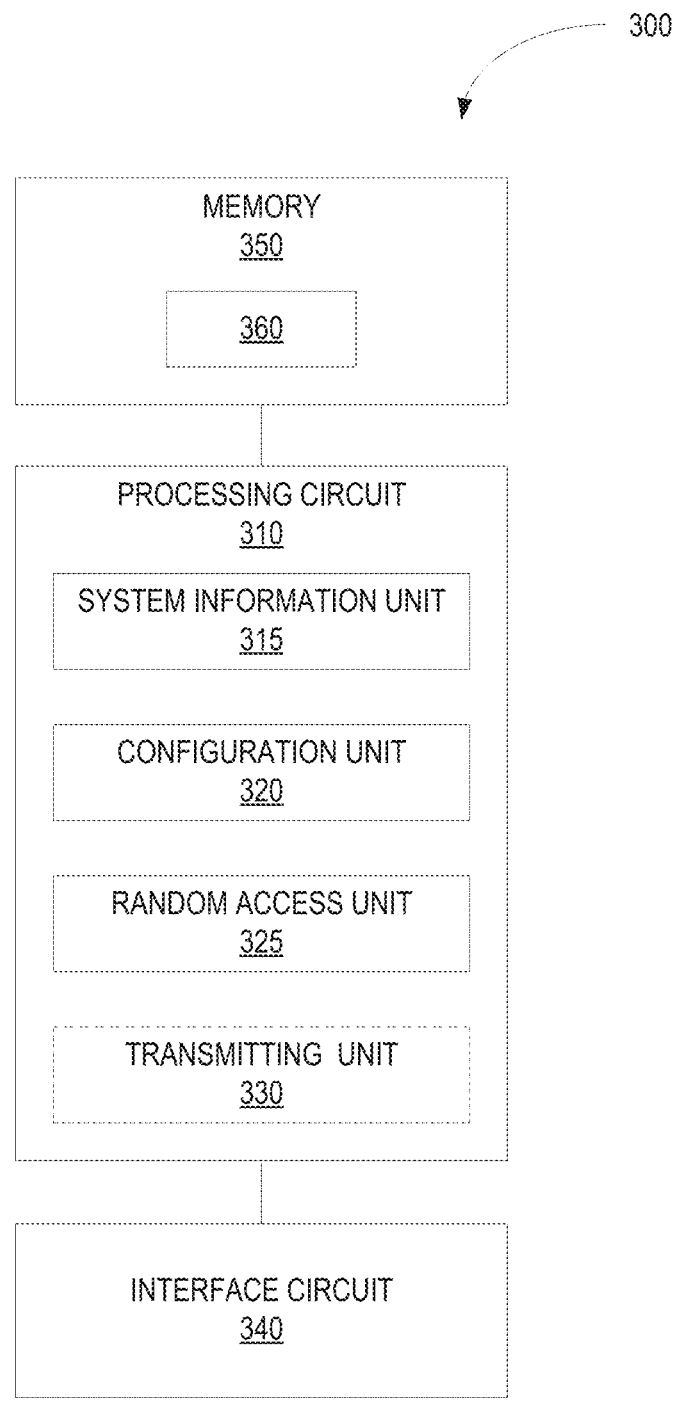
FIG. 9 illustrates an exemplary wireless device configured for operation in a mixed numerology wireless communication network.

FIG. 9 illustrates the main functional components of a wireless device 300, configured for use in a mixed numerology wireless communication network 10. The wireless device 300 can be configured to perform one or more of the methods shown in FIGS. 4-8. The wireless device 300 comprises a processing circuit 310, an interface circuit 340, and memory 350.

The interface circuit 340 is coupled to one or more antennas (not shown) and comprises the Radio Frequency (RF) components needed for communicating with the base station 20 over a wireless communication channel. Typically, the RF components include a transmitter and receiver adapted for communications according to the NR standards or other Radio Access Technology (RAT).

The processing circuit 310 processes the signals transmitted to or received by the wireless device 300. Such processing includes coding and modulation of transmitted signals, and the demodulation and decoding of received signals. The processing circuit 310 includes a system information unit 315 for receiving and processing the SI and other configuration information transmitted by the base station 20, a configuration unit 320 to configure random access procedures for the wireless device 30, and a random access unit 325 to perform random access procedures. In some embodiments, processing circuit 310 of the wireless device 300 further comprises a transmitting unit 330 for transmitting data. As one example, the transmitting unit 330 may be configured to transmit data on an UL shared channel. The processing circuit 310 may comprise one or more microprocessors, hardware, firmware, or a combination thereof. In one embodiment, the system information unit 315 and random access unit 325 are implemented by a single microprocessor. In other embodiments, the system information unit 315 and random access unit 325 are implemented using different microprocessors.

Memory 350 comprises both volatile and non-volatile memory for storing computer program code and data needed by the processing circuit 310 for operation. Memory 350 may comprise any tangible, non-transitory computer-readable storage medium for storing data including electronic, magnetic, optical, electromagnetic, or semiconductor data storage. Memory 350 stores a computer program 360 comprising executable instructions that configure the processing circuit 310 to implement methods according to FIGS. 4-8 as described herein. In general, computer program instructions and configuration information are stored in a non-volatile memory, such as a Read Only Memory (ROM), Erasable Programmable Read Only Memory (EPROM) or flash memory. Temporary data generated during operation may be stored in a volatile memory, such as a Random Access Memory (RAM). In some embodiments, computer program 360 for configuring the processing circuit 310 as herein described may be stored in a removable memory, such as a portable compact disc, portable digital video disc, or other removable media. The computer program 360 may also be embodied in a carrier such as an electronic signal, optical signal, radio signal, or computer readable storage medium.

Figure 10:
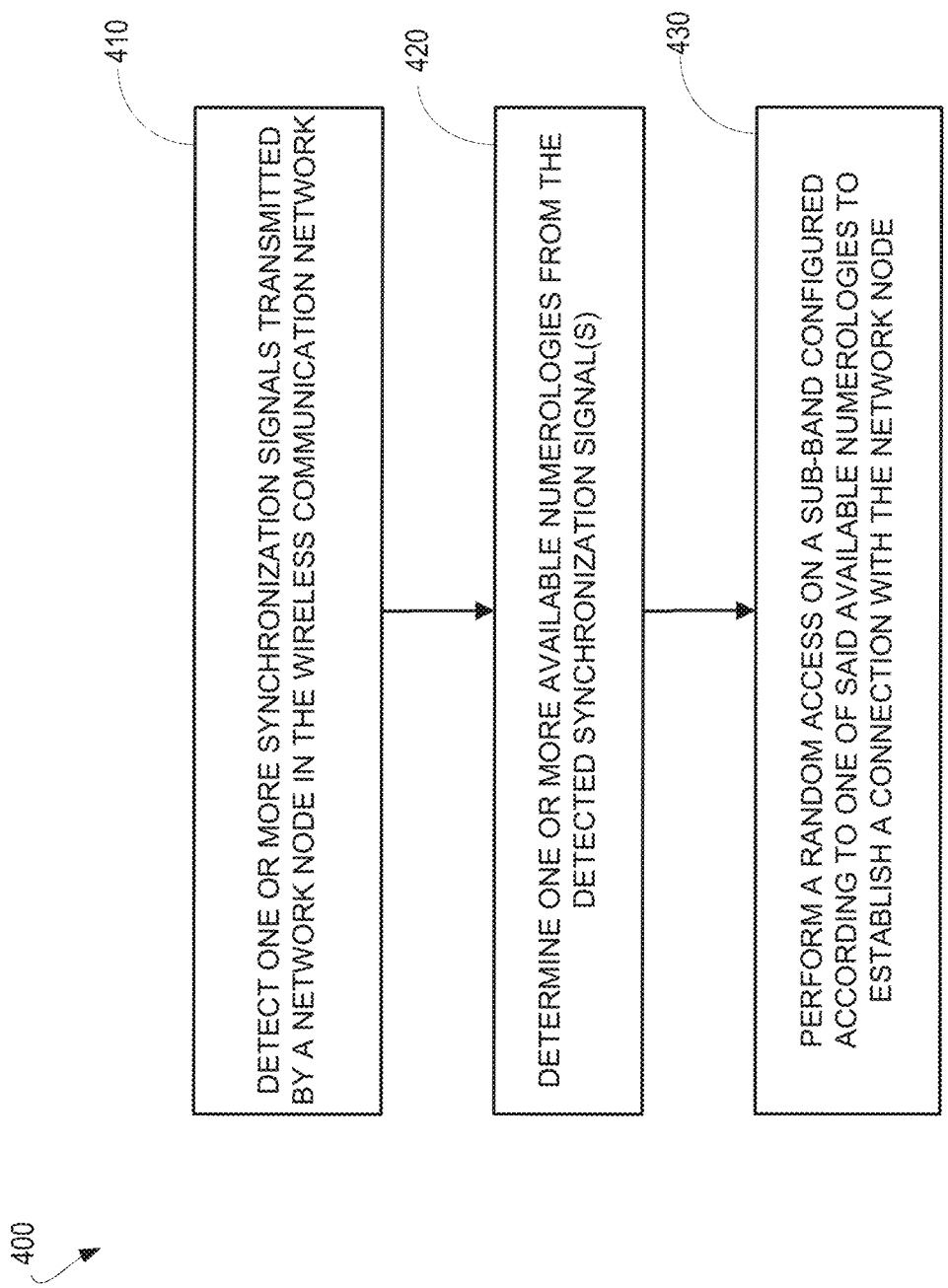
FIG. 10 illustrates a sixth exemplary method of random access implemented by a wireless device in a mixed numerology wireless communication network.

FIG. 10 illustrates another random access method 400 for a wireless communication network 10 that supports multiple numerologies that are used for different service types. A wireless device 30 that needs to perform a random access to connect to the base station 20 or other network node detects one or more synchronization signals transmitted by the base station 20 or other network node (block 410). The wireless device 30 determines one or more available numerologies from the detected synchronization signals (block 420) and performs a random access on a sub-band configured according to one of said available numerologies to establish a connection with the base station 20 or other network node (block 430). In one embodiment, the sub-band comprises the carrier frequency or frequency resources used for random access.

In some embodiments of the method 400, the wireless device 30 determines the numerologies of the detected synchronization signals and considers the numerologies of the detected synchronization signals to be the available numerologies for random access.

In other embodiments of the method 400, the wireless device 30 determines the numerologies for the detected synchronization signals and then determines the numerologies for the RACHs from the numerologies of the detected synchronization signals based on a pre-determined rule.

However the available numerologies are determined, the wireless device 30 may, in some embodiments of the method 400, select one of the available numerologies based on a service type for the desired connection and/or device type of the wireless device 30. In these embodiments, the wireless device 30 determines a service type for the connection with a base station 20 or other network node or a device type of the wireless device. The wireless device 30 selects a sub-band configured according to one of the available numerologies based on the service type, device type, or both, and performs a random access on the selected sub-band.

Figure 11:
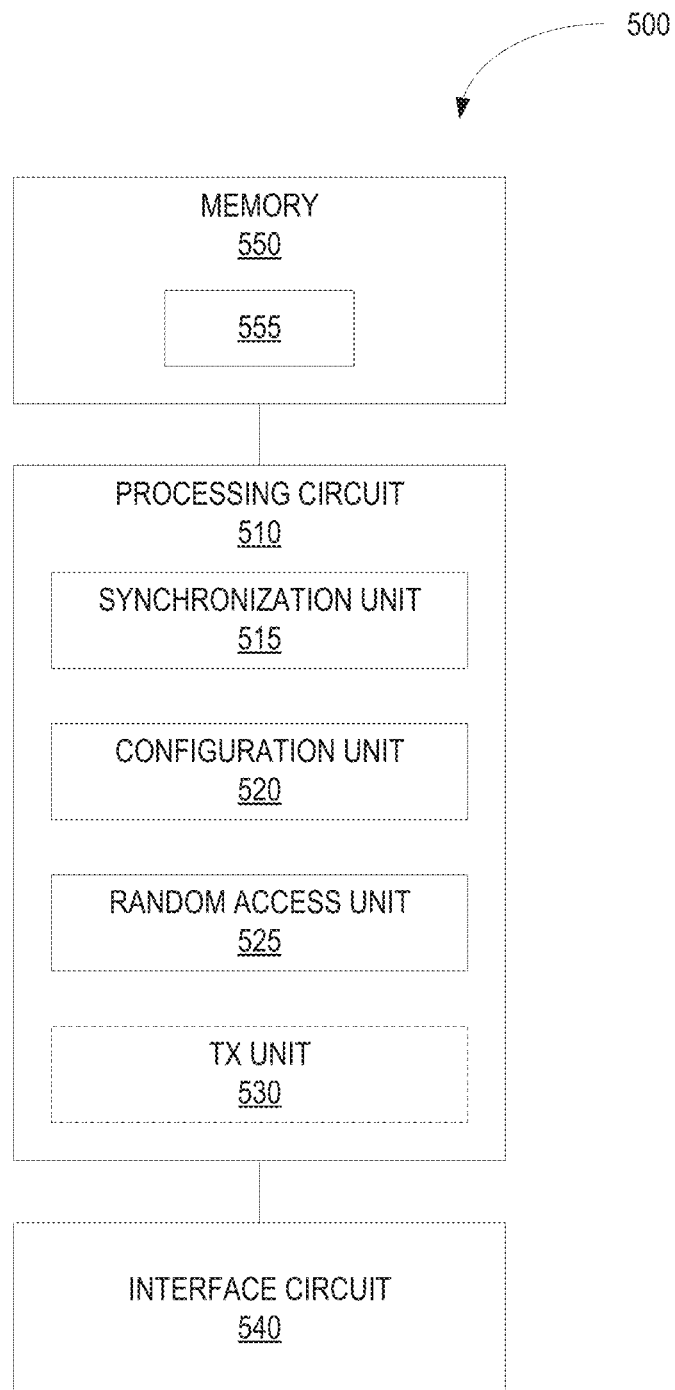
FIG. 11 illustrates a wireless device according to another embodiment configured for operation in a mixed numerology wireless communication network.

FIG. 11 illustrates a wireless device 500 according to another embodiment. The wireless device 500 comprises a processing circuit 510, an interface circuit 540, and memory 550.

The interface circuit 540 is coupled to one or more antennas (not shown) and comprises the RF components needed for communicating with the base station 20 over a wireless communication channel. Typically, the RF components include a transmitter and receiver adapted for communications according to the NR standards or other RAT.

The processing circuit 510 processes the signals transmitted to or received by the wireless device 500. Such processing includes coding and modulation of transmitted signals, and the demodulation and decoding of received signals. The processing circuit 510 includes a synchronization unit 515 for receiving and processing synchronization signals transmitted by the base station 20, a configuration unit 520 to configure random access procedures for the wireless device 500, and a random access unit 525 to perform random access procedures. In some embodiments, processing circuit 510 of the wireless device 500 further comprises a transmitting unit 530 for transmitting data. As one example, the transmitting (TX) unit 530 may be configured to transmit data on an UL shared channel. The processing circuit 510 may comprise one or more microprocessors, hardware, firmware, or a combination thereof. In one embodiment, the synchronization unit 515 and random access unit 525 are implemented by a single microprocessor. In other embodiments, the synchronization unit 515 and random access unit 525 are implemented using different microprocessors.

Memory 550 comprises both volatile and non-volatile memory for storing computer program code and data needed by the processing circuit 510 for operation. Memory 550 may comprise any tangible, non-transitory computer-readable storage medium for storing data including electronic, magnetic, optical, electromagnetic, or semiconductor data storage. Memory 550 stores a computer program 555 comprising executable instructions that configure the processing circuit 510 to implement methods 400 according to FIG. 10 as described herein. In general, computer program instructions and configuration information are stored in a non-volatile memory, such as a ROM, EPROM or flash memory. Temporary data generated during operation may be stored in a volatile memory, such as a RAM. In some embodiments, computer program 555 for configuring the processing circuit 510 as herein described may be stored in a removable memory, such as a portable compact disc, portable digital video disc, or other removable media. The computer program 555 may also be embodied in a carrier such as an electronic signal, optical signal, radio signal, or computer readable storage medium.

Figure 12:
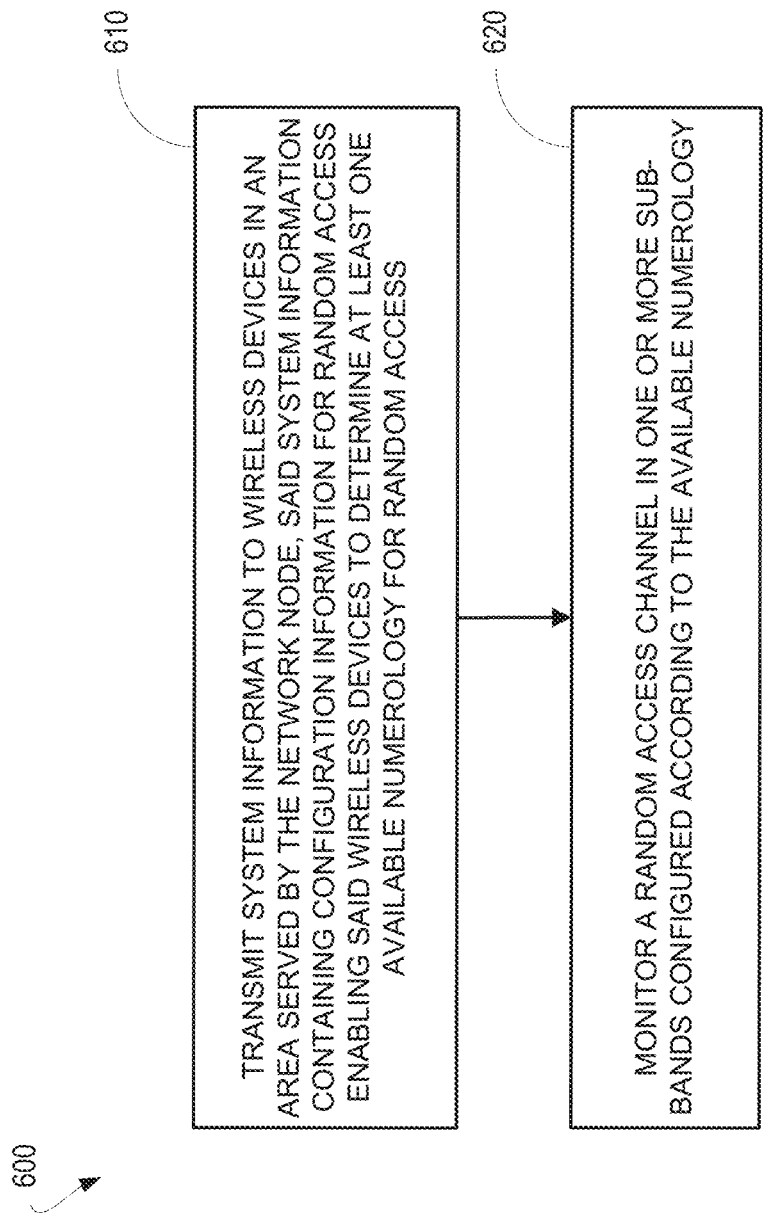
FIG. 12 illustrates a first exemplary method of random access implemented by a base station or other network node in a mixed numerology wireless communication network.

FIG. 12 illustrates an exemplary random access method 600 implemented by a base station 20 or other network node in the wireless communication network 10 supporting mixed numerologies for different service types. The base station 20 or other network node transmits SI to wireless devices 30 in an area served by the base station 20 or other network node (block 610). The SI contains configuration information for random access enabling the wireless devices 30 in the service area of the base station 20 to determine at least one available numerology for random access. The base station 20 or other network node monitors a random access channel in one or more sub-bands configured according to the available numerology or numerologies (block 620). In one embodiment, the sub-band comprises the carrier or frequency resources used for random access.

In some embodiments, the configuration information indicates two or more available numerologies for random access and the base station 20 or other network node monitors random access channels in sub-bands configured according to two or more available numerologies. In one embodiment, the configuration information indicates an available numerology for random access that is the same as or substantially similar to a numerology used by the base station 20 or other network node to receive data transmissions on an UL traffic channel. In this embodiment, the method 600 further comprises receiving a preamble transmitted by a wireless device 30 using the processing hardware adapted to receive data transmissions from the wireless device 30 on the UL traffic channel.

Figure 13:
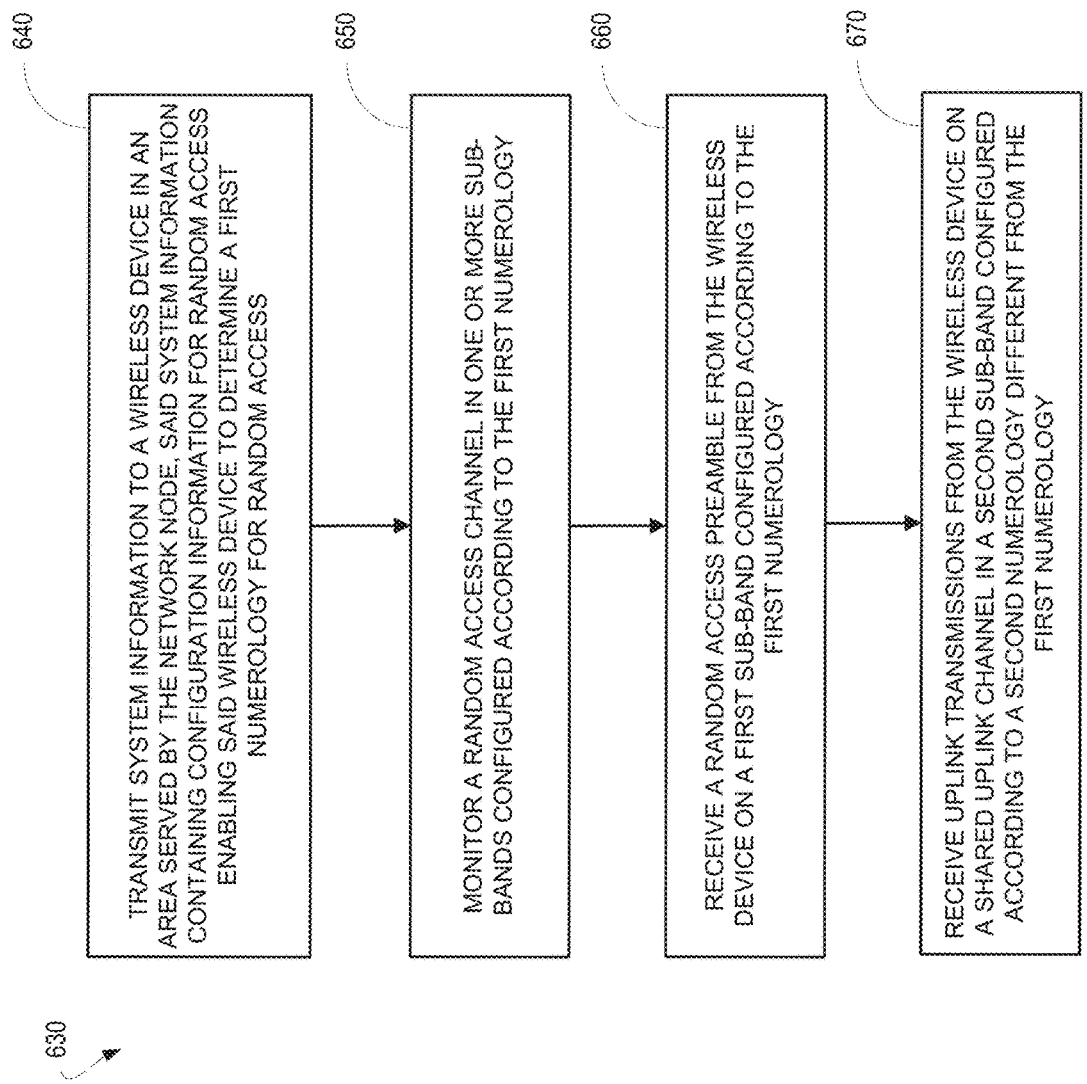
FIG. 13 illustrates a second exemplary method of random access implemented by a base station or other network node in a mixed numerology wireless communication network.

FIG. 13 illustrates an exemplary random access method 630 according to another embodiment implemented by a base station 20 or other network node in the wireless communication network 10 supporting mixed numerologies for different service types. The base station 20 or other network node transmits SI to wireless devices 30 in an area served by the base station 20 or other network node (block 640). The SI contains configuration information for random access enabling the wireless devices 30 in the service area of the base station 20 to determine a first numerology for random access. The base station 20 or other network node monitors a random access channel configured according to the first numerology (block 650). The method 630 further comprises receiving, by the base station 20 or other network node, a random access preamble from the wireless device 30 on a first sub-band configured according to the first numerology (block 660). The base station 20 or other network node subsequently receives an UL transmission from the wireless device 30 on a shared UL channel in a second sub-band configured according to a second numerology different from the first numerology (block 670). In one embodiment, the first and second sub-bands may comprise the carrier or frequency resources used for random access and UL shard channel, respectively.

Figure 14:
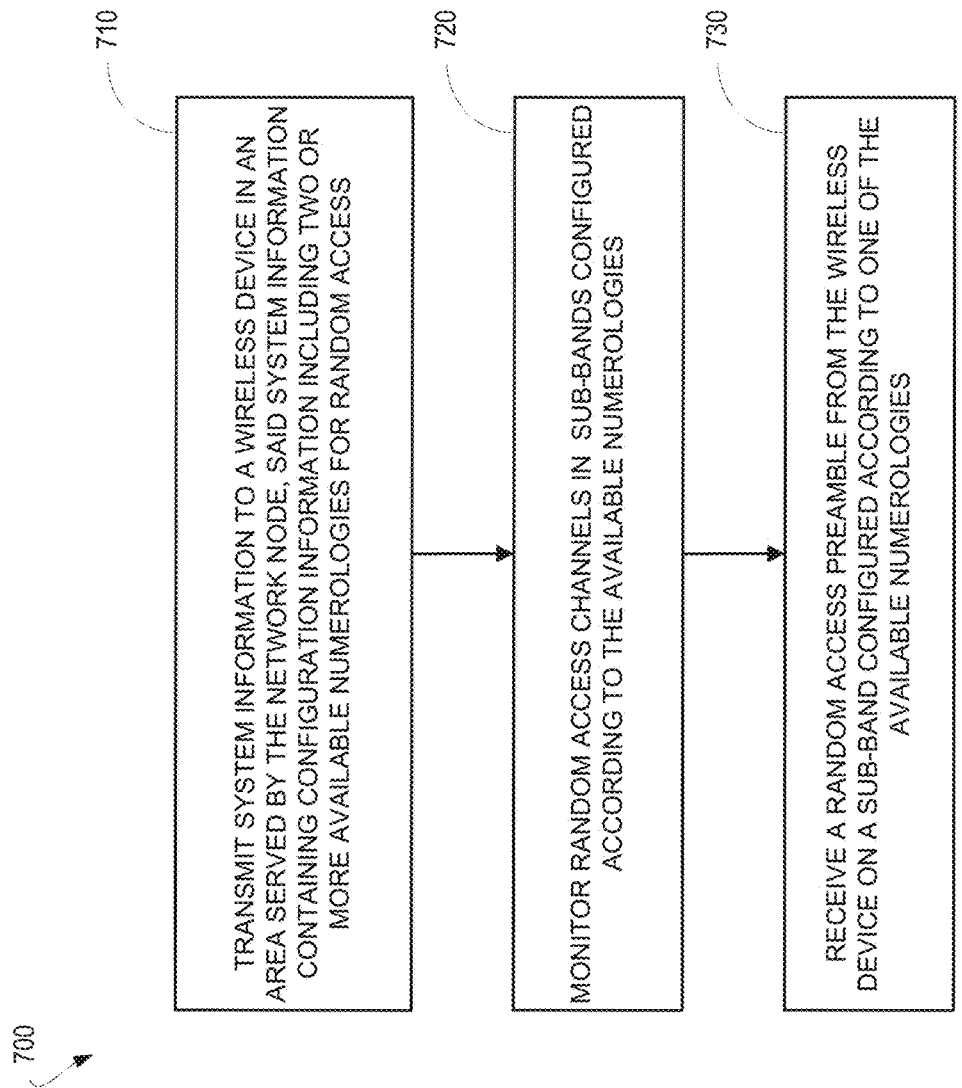
FIG. 14 illustrates a third exemplary method of random access implemented by a base station or other network node in a mixed numerology wireless communication network.

FIG. 14 illustrates an exemplary random access method 700 according to another embodiment implemented by a base station 20 or other network node in the wireless communication network 10 supporting mixed numerologies for different service types. The base station 20 or other network node transmits SI to wireless devices 30 in an area served by the base station 20 or other network node (block 710). The SI contains configuration information including two or more available numerologies for random access. The base station 20 or other network node monitors random access channels in sub-bands configured according the available numerologies (block 720). The method further comprises receiving, by the base station 20 or other network node, a random access preamble from the wireless device on a sub-band configured according to one of the available numerologies (block 730).

Figure 15:
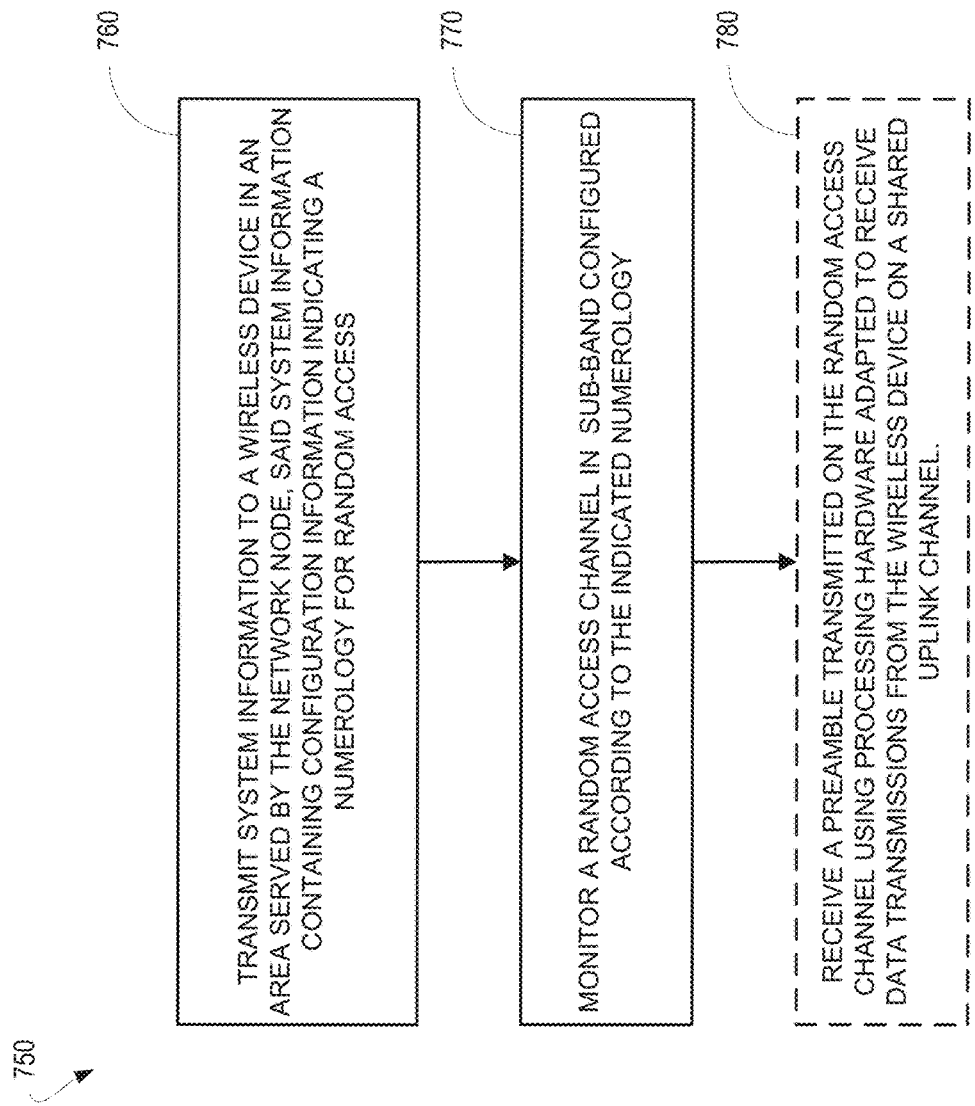
FIG. 15 illustrates a fourth exemplary method of random access implemented by a base station or other network node in a mixed numerology wireless communication network.

FIG. 15 illustrates an exemplary random access method 750 according to another embodiment implemented by a base station 20 or other network node in the wireless communication network 10 supporting mixed numerologies for different service types. The base station 20 or other network node transmits SI to wireless devices 30 in an area served by the base station 20 or other network node (block 760). The SI contains configuration information indicating a numerology for random access. The base station 20 or other network node monitors a random access channel configured according to the indicated numerology (block 770). In some embodiments, the base station 20 subsequently receives a preamble transmitted on the random access channel using processing hardware adapted to receive data transmissions from the wireless device on a shared UL channel (block 780).

Figure 16:
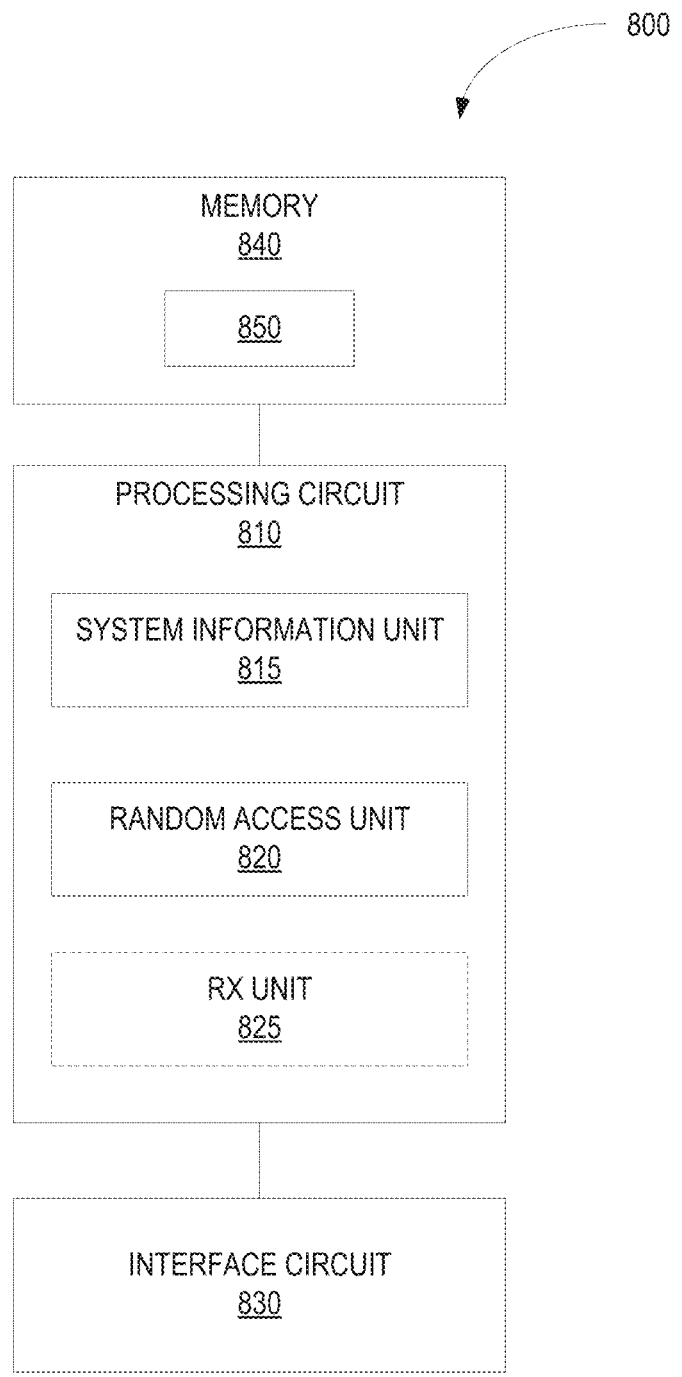
FIG. 16 illustrates an exemplary network node (e.g., base station) configured for operation in a mixed numerology wireless communication network.

FIG. 16 illustrates the main functional components of a network node 800, such as a base station, configured for use in a mixed numerology wireless communication network 10. The network node 800 comprises a processing circuit 810, an interface circuit 830, and memory 840.

The interface circuit 830 is coupled to one or more antennas (not shown) and comprises the RF components needed for communicating with the wireless devices 30 over a wireless communication channel. Typically, the RF components include a transmitter and receiver adapted for communications according to the NR standards or other RAT.

The processing circuit 810 processes the signals transmitted to or received by the network node 800. Such processing includes coding and modulation of transmitted signals, and the demodulation and decoding of received signals. The processing circuit 810 includes a SI unit 815 for generating and transmitting the SI and other configuration information to wireless devices 30 in the area served by the base station 800, and a random access unit 820 to monitor the random access channels and perform random access procedures. In some embodiments, the processing circuit 810 further comprises a receiving (RX) unit 825 for receiving transmissions from the wireless device in the PRACH and/or USCH. The processing circuit 810 may comprise one or more microprocessors, hardware, firmware, or a combination thereof. In one embodiment, the SI unit 815, random access unit 820 and RX unit 825 are implemented by a single microprocessor. In other embodiments, the SI unit 815 and random access unit 820 are implemented using different microprocessors.

Memory 840 comprises both volatile and non-volatile memory for storing computer program code and data needed by the processing circuit 810 for operation. Memory 840 may comprise any tangible, non-transitory computer-readable storage medium for storing data including electronic, magnetic, optical, electromagnetic, or semiconductor data storage. Memory 840 stores a computer program 850 comprising executable instructions that configure the processing circuit 810 to implement methods according to FIGS. 12-15. In general, computer program instructions and configuration information are stored in a non-volatile memory, such as a ROM, EPROM or flash memory. Temporary data generated during operation may be stored in a volatile memory, such as a RAM. In some embodiments, computer program 850 for configuring the processing circuit 810 as herein described may be stored in a removable memory, such as a portable compact disc, portable digital video disc, or other removable media. The computer program (850) may also be embodied in a carrier such as an electronic signal, optical signal, radio signal, or computer readable storage medium.

Figure 17:
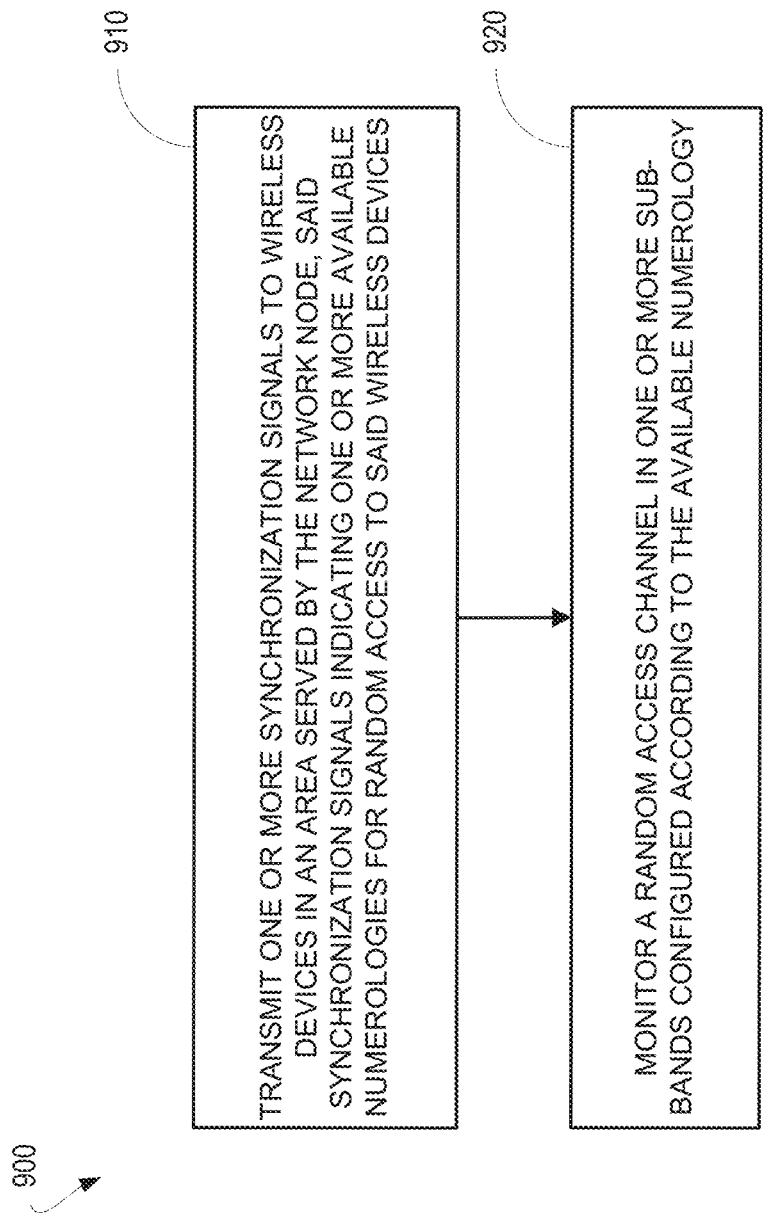
FIG. 17 illustrates another exemplary method of random access implemented by a base station or other network node in a mixed numerology wireless communication network.

FIG. 17 illustrates an exemplary random access method 900 implemented by a base station 20 or other network node in the wireless communication network 10 supporting mixed numerologies for different service types. The base station 20 or other network node transmits one or more synchronization signals to wireless devices 30 in an area served by the base station 20 or other network node (block 910). The synchronization signals implicitly indicate the available numerology or numerologies used for random access to the wireless devices 30 in the service area of the base station 20. The base station 20 or other network node monitors a random access channel in one or more sub-bands configured according to the available numerology or numerologies (block 920). In some embodiments, the configuration information indicates two or more available numerologies for random access and the base station 20 or other network node monitors random access channels in sub-bands configured according to two or more available numerologies.

In one embodiment, the configuration information indicates an available numerology for random access that is the same as or substantially similar to a numerology used by the base station 20 or other network node to receive data transmissions on an UL traffic channel. In this embodiment, the method 900 further comprises receiving a preamble transmitted by a wireless device 30 using the processing hardware adapted to receive data transmissions from the wireless device 30 on the UL traffic channel.

Figure 18:
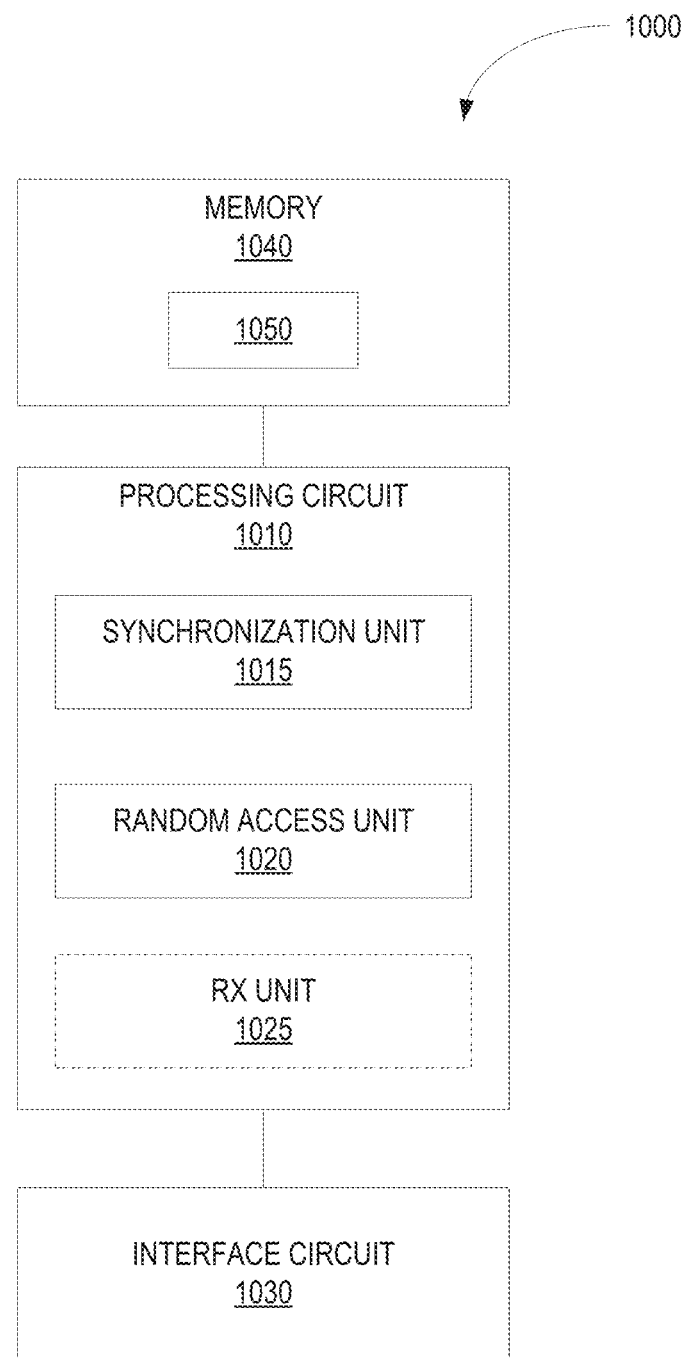
FIG. 18 illustrates a network node (e.g., base station) according to another embodiment configured for operation in a mixed numerology wireless communication network.

FIG. 18 illustrates the main functional components of a network node 1000, such as a base station 20, configured for use in a mixed numerology wireless communication network 10. The network node 1000 comprises a processing circuit 1010, an interface circuit 1030, and memory 1040.

The interface circuit 1030 is coupled to one or more antennas (not shown) and comprises the RF components needed for communicating with the wireless devices 30 over a wireless communication channel. Typically, the RF components include a transmitter and receiver adapted for communications according to the NR standards or other RAT.

The processing circuit 1010 processes the signals transmitted to or received by the network node 1000. Such processing includes coding and modulation of transmitted signals, and the demodulation and decoding of received signals. The processing circuit 1010 includes a synchronization unit 1015 for generating and transmitting synchronization signals to wireless devices 30 in the area served by the base station 1000, and a random access unit 1020 to monitor the random access channels and perform random access procedures. In some embodiments, the processing circuit 1010 further comprises a receiving (RX) unit 1025 for receiving transmissions from the wireless device in the PRACH and/or USCH. The processing circuit 1010 may comprise one or more microprocessors, hardware, firmware, or a combination thereof. In one embodiment, the synchronization unit 1015, random access unit 1020 and RX unit 1025 are implemented by a single microprocessor. In other embodiments, the synchronization unit 1015 and random access unit 1020 are implemented using different microprocessors.

Memory 1040 comprises both volatile and non-volatile memory for storing computer program code and data needed by the processing circuit 1010 for operation. Memory 1040 may comprise any tangible, non-transitory computer-readable storage medium for storing data including electronic, magnetic, optical, electromagnetic, or semiconductor data storage. Memory 1040 stores a computer program 1050 comprising executable instructions that configure the processing circuit 1010 to implement methods 900 according to FIG. 17. In general, computer program instructions and configuration information are stored in a non-volatile memory, such as a ROM, EPROM or flash memory. Temporary data generated during operation may be stored in a volatile memory, such as a RAM. In some embodiments, computer program 1050 for configuring the processing circuit 1010 as herein described may be stored in a removable memory, such as a portable compact disc, portable digital video disc, or other removable media. The computer program (1050) may also be embodied in a carrier such as an electronic signal, optical signal, radio signal, or computer readable storage medium.

Figure 19:
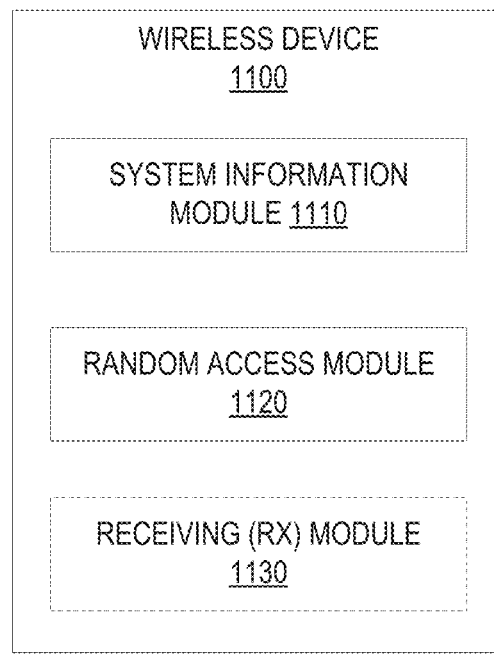
FIG. 19 illustrates a wireless device according to another embodiment configured for operation in a mixed numerology wireless communication network.

FIG. 19 illustrates a wireless device 1100 according to another embodiment configured to perform the methods of FIGS. 4-8 as herein described. The wireless device 1110 includes a system information module 1110, a configuration module 1120, and a random access module 1130. The system information module 1110 is configured to receive and process the SI and other configuration information transmitted by the base station or other network node. The SI may comprise configuration information indicating a configuration for random access, and/or configuration information indicating one or more available numerologies. The configuration module 1120 is adapted to determine a sub-band and configure random access procedures for the wireless device 1100 based on the configuration information as herein described. The random access module 1120 is configured to determine a sub-band/numerology for random access and perform random access procedures as herein described. Some embodiments may further include a transmitting (TX) module 1130 for transmitting data. As one example, the TX module 1130 may be configured to transmit data on a PRACH and/or an UL shared channel. The various modules 1110, 1120, and 1130 can be implemented by hardware and/or by software code that is executed by a processor or processing circuit.

Figure 20:
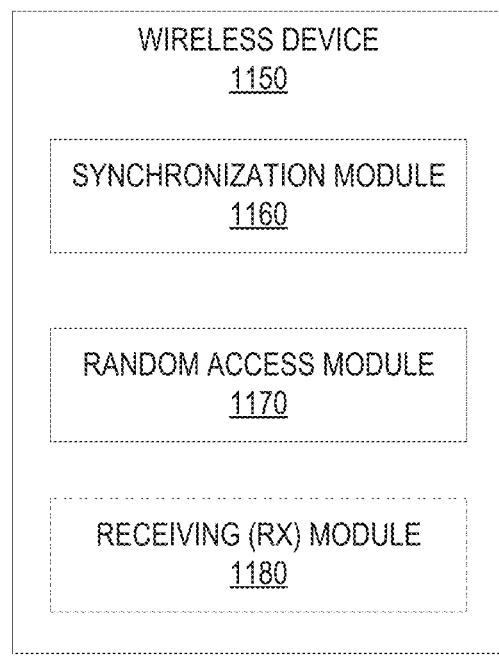
FIG. 20 illustrates a wireless device according to another embodiment configured for operation in a mixed numerology wireless communication network.

FIG. 20 illustrates a wireless device 1150 according to another embodiment configured to perform the method of FIG. 10 as herein described. The wireless device 1150 includes a synchronization module 1160, and a random access module 1170. The synchronization module 1160 is configured to receive and process the synchronization signals transmitted by a base station or network node. The random access module 1170 is configured to determine a sub-band/numerology for random access and perform random access procedures as herein described. Some embodiments may further include a transmitting (TX) module 1180 for transmitting data. As one example, the TX module 1180 may be configured to transmit data on a PRACH and/or an UL shared channel. The various modules 1160, 1170, and 1180 can be implemented by hardware and/or by software code that is executed by a processor or processing circuit.

Figure 21:
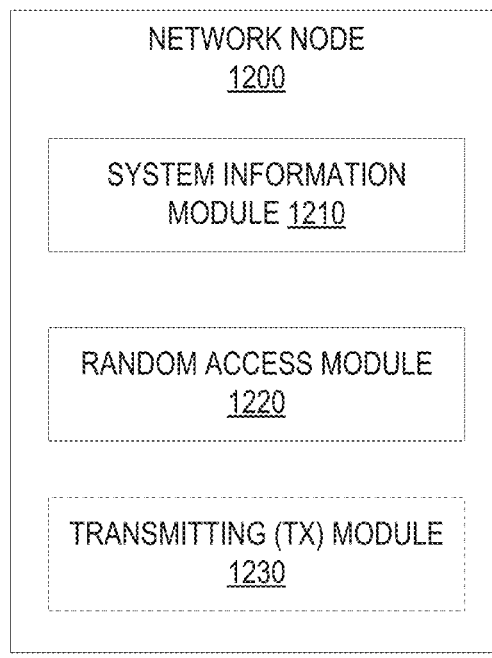
FIG. 21 illustrates a network node (e.g., base station) according to another embodiment configured for operation in a mixed numerology wireless communication network.

FIG. 21 illustrates a network node (e.g., base station) 1200 according to another embodiment configured to perform the methods of FIGS. 12-15 as herein described. The network node 1200 includes a system information (SI) module 1210 and a random access module 1220. The system information (SI) module 1210 is configured to generate and transmit the SI and other configuration information to wireless devices in the area served by the network node 1200. The random access module 1220 is configured to monitor the random access channels and perform random access procedures. In some embodiments, the network node 1200 further comprises a receiving (RX) module 1230 for receiving transmissions from the wireless device in the PRACH and/or USCH. The various modules 1210, 1220, and 1230 can be implemented by hardware and/or by software code that is executed by a processor or processing circuit.

Figure 22:
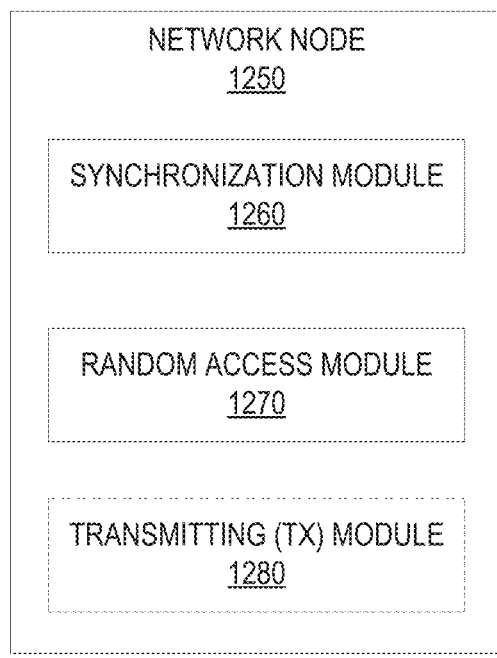
FIG. 22 illustrates a network node (e.g., base station) according to another embodiment configured for operation in a mixed numerology wireless communication network.

FIG. 22 illustrates a network node (e.g., base station) 1250 according to another embodiment perform the methods of FIG. 17 as herein described. The network node 1250 includes a synchronization module 1260 and a random access module 1270. The synchronization module 1260 is configured to generate the synchronization signals and transmit the synchronization signal to wireless devices in an area served by the network node 1250. The random access module 1270 is configured to monitor the random access channels and perform random access procedures. In some embodiments, the network node 1250 further comprises a receiving (RX) module 1280 for receiving transmissions from the wireless device in the PRACH and/or USCH. The various modules 1260, 1270, and 1280 can be implemented by hardware and/or by software code that is executed by a processor or processing circuit.

What is claimed is:

1. A method of random access implemented by a wireless device in a mixed numerology wireless communication network, said method comprising:
   receiving system information from a network node, said system information containing a System Information Block (SIB) indicating a configuration for random access;
   selecting a carrier for random access configured according to a numerology determined from two or more numerologies available for random access as indicated by the SIB; and
   performing a random access on the selected carrier to establish a connection with the network node.

2. The method of claim 1 wherein the first SIB comprises a default configuration for random access.

3. The method of claim 1 wherein determining a numerology for random access based on the SIB comprises:
   generating, based on said SIB, a mapping associating service types to corresponding numerologies;
   determining a service type for the connection with the network node; and
   determining the numerology based on the service type.

4. The method of claim 1 wherein determining the numerology from the two or more numerologies available for random access as indicated by said SIB comprises:
   determining a service type for the connection with the network node; and
   selecting the first numerology from said available numerologies based on the service type.

5. A method implemented by a network node in a mixed numerology wireless communication network, said method comprising:
   transmitting system information to a wireless device in an area served by the network node, said system information containing a System Information Block (SIB) for random access enabling said wireless device to determine a numerology for random access, wherein the SIB indicates two or more available numerologies for random access;
   monitoring random access channels on one or more carriers configured according to the two or more of said available numerologies; and
   receiving a random access preamble from the wireless device on one of said one or more carriers configured according to the numerology.

6. A wireless device configured for use in a mixed numerology wireless communication network, the wireless device comprising:
   an interface circuit for communicating with a network node;
   a processing circuit configured to:
      receive system information from a network node, said system information containing a System Information Block (SIB) indicating a configuration for random access;
      select a carrier for random access configured according to a numerology determined from two or more numerologies available for random access as indicated by the SIB;
      perform a random access on the selected carrier to establish a connection with the network node.

7. The wireless device of claim 6 wherein the first SIB comprises a default configuration for random access.

8. The wireless device of claim 6 wherein the processing circuit is further configured to:
   generate, based on said SIB, a mapping associating service types to corresponding numerologies;
   determine a service type for the connection with the network node; and
   determine the numerology based on the service type.

9. The wireless device of claim 6 wherein the processing circuit is further configured to:
   determine a service type for the connection with the network node; and
   determine the numerology from said available numerologies based on the service type.

10. The wireless device of claim 6 wherein the processing circuit is further configured to:
    determine a device type of the wireless device; and
    determine the numerology from said available numerologies based on the device type.

11. A network node in a mixed numerology wireless communication network, the network node comprising:
    an interface circuit for communicating with wireless devices in an area served by the network node;
    a processing circuit configured to:
       transmit system information to wireless devices in an area served by the network node, said system information containing a System Information Block (SIB) for random access enabling said wireless devices to determine a numerology for random access, wherein the SIB indicates two or more available numerologies for random access;
       monitor random access channels on one or more carriers configured according to the two or more of said available numerologies; and
       receive a random access preamble from the wireless device on one of said one or more carriers configured according to the numerology.

12. A non-transitory computer-readable storage medium containing a computer program comprising executable instructions that, when executed by a processing circuit in a wireless device causes the wireless device to:
- receive system information from a network node in said wireless communication network, said system information containing a System Information Block (SIB) indicating a configuration for random access;
- select a carrier for random access configured according to a numerology determined from two or more numerologies available for random access as indicated by the SIB; and
- perform a random access on the selected carrier to establish a connection with the network node.

13. A non-transitory computer-readable storage medium containing a computer program comprising executable instructions that, when executed by a processing circuit in a network node causes the network node to:
- transmit system information to wireless devices in an area served by the network node, said system information containing a System Information Block (SIB) for random access enabling said wireless devices to determine a first numerology for random access, wherein the SIB indicates two or more available numerologies for random access;
- monitor random access channels on one or more carriers configured according to the two or more of said available numerologies; and
- receive a random access preamble from the wireless device on one of said one or more carriers configured according to the numerology.

* * * * *

UNITED STATES PATENT AND TRADEMARK OFFICE
CERTIFICATE OF CORRECTION

PATENT NO. : 11,304,196 B2
APPLICATION NO. : 17/089165
DATED : April 12, 2022
INVENTOR(S) : Liu et al.

Page 1 of 2

It is certified that error appears in the above-identified patent and that said Letters Patent is hereby corrected as shown below:

In the Specification

In Column 1, Line 7, delete "2019," and insert -- 2019, now U.S. Pat. No. 10,925,064, --, therefor.

In Column 3, Line 3, delete "according a" and insert -- according to a --, therefor.

In Column 6, Line 10, delete "Referenced" and insert -- Reference --, therefor.

In Column 6, Line 19, delete "Status" and insert -- State --, therefor.

In Column 7, Line 11, delete "than -1 GHz" and insert -- than-1 GHz --, therefor.

In Column 8, Line 39, delete "KHz)," and insert -- kHz), --, therefor.

In Column 8, Line 42, delete "KHz)." and insert -- kHz). --, therefor.

In Column 9, Line 61, delete "and/or and" and insert -- and/or --, therefor.

In Column 13, Line 23, delete "method 140" and insert -- method 150 --, therefor.

In Column 17, Line 2, delete "methods 400" and insert -- method 400 --, therefor.

In Column 18, Line 11, delete "according" and insert -- according to --, therefor.

In Column 20, Line 15, delete "methods 900" and insert -- method 900 --, therefor.

In Column 20, Line 30, delete "wireless device 1110" and insert -- wireless device 1100 --, therefor.

Signed and Sealed this
Thirtieth Day of August, 2022

Katherine Kelly Vidal
*Director of the United States Patent and Trademark Office*

CERTIFICATE OF CORRECTION (continued)
U.S. Pat. No. 11,304,196 B2

In the Claims

In Column 22, Line 18, in Claim 6, delete "a network node," and insert -- the network node, --, therefor.